United States Patent
Esenlik et al.

(10) Patent No.: US 12,439,045 B2
(45) Date of Patent: *Oct. 7, 2025

(54) ENCODER, DECODER AND CORRESPONDING METHODS FOR SUB-BLOCK PARTITIONING MODE

(71) Applicant: HUAWEI TECHNOLOGIES CO., LTD., Shenzhen (CN)

(72) Inventors: Semih Esenlik, Munich (DE); Max Blaeser, Aachen (DE); Zhijie Zhao, Shenzhen (CN); Han Gao, Shenzhen (CN); Anand Meher Kotra, Munich (DE); Biao Wang, Shenzhen (CN); Elena Alexandrovna Alshina, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,198

(22) Filed: Mar. 13, 2024

(65) Prior Publication Data

US 2024/0275967 A1     Aug. 15, 2024

Related U.S. Application Data

(63) Continuation of application No. 18/076,200, filed on Dec. 6, 2022, now Pat. No. 11,962,773, which is a (Continued)

(30) Foreign Application Priority Data

Jun. 21, 2019 (WO) ................. PCT/EP2019/066432

(51) Int. Cl.
    *H04N 19/119*    (2014.01)
    *H04N 19/105*    (2014.01)
    (Continued)

(52) U.S. Cl.
CPC ......... *H04N 19/119* (2014.11); *H04N 19/105* (2014.11); *H04N 19/176* (2014.11); *H04N 19/184* (2014.11); *H04N 19/159* (2014.11)

(58) Field of Classification Search
None
See application file for complete search history.

(56) References Cited

U.S. PATENT DOCUMENTS

| 9,326,003 B2 | 4/2016 | Guo et al. |
| 11,122,266 B2 * | 9/2021 | Zhang ................. H04N 19/119 |

(Continued)

FOREIGN PATENT DOCUMENTS

| CN | 101491107 A | 7/2009 |
| CN | 102484706 A | 5/2012 |

(Continued)

OTHER PUBLICATIONS

"JVET Ad hoc group report: Project management," Joint Video Experts Team (JVET) of ITU-T SG 16 WP 3 and ISO/IEC JTC 1/SC 29/WG 11, 14th Meeting: Geneva, CH, JVET-N0001-v1, Total 2 pages (Mar. 27, 2019).

(Continued)

*Primary Examiner* — Chikaodili E Anyikire
(74) *Attorney, Agent, or Firm* — Leydig, Voit & Mayer, Ltd.

(57) ABSTRACT

A method of coding implemented by a decoding device, comprising obtaining a bitstream; obtaining a value of an indicator for a current block according to the bitstream; obtaining a value of a first parameter for the current block and a value of a second parameter for the current block, according to the value of the indicator and a predefined lookup table; obtaining a value of a sample distance for a sample which is located in the current block, according to the value of the first parameter and the value of the second (Continued)

parameter; obtaining a prediction value for the sample, according to the value of the sample distance for the sample.

14 Claims, 17 Drawing Sheets

Related U.S. Application Data continuation of application No. 17/154,788, filed on Jan. 21, 2021, now Pat. No. 11,539,948, which is a continuation of application No. PCT/CN2020/097032, filed on Jun. 19, 2020.

(51) Int. Cl.
*H04N 19/176* (2014.01)
*H04N 19/184* (2014.01)
*H04N 19/159* (2014.01)

(56) References Cited

U.S. PATENT DOCUMENTS

| | | | |
|---|---|---|---|
| 2009/0257492 A1 | 10/2009 | Andersson et al. | |
| 2009/0268810 A1 | 10/2009 | Dai | |
| 2011/0200111 A1* | 8/2011 | Chen | H04N 19/137 375/240.16 |
| 2012/0106627 A1* | 5/2012 | Guo | H04N 19/70 375/E7.146 |
| 2012/0147961 A1* | 6/2012 | Guo | H04N 19/17 375/240.16 |
| 2017/0280156 A1* | 9/2017 | Divorra Escoda | H04N 19/44 |
| 2019/0082176 A1 | 3/2019 | Zhang et al. | |
| 2020/0404267 A1 | 12/2020 | Liao et al. | |
| 2021/0136407 A1* | 5/2021 | Aono | H04N 19/55 |
| 2021/0160520 A1 | 5/2021 | Chen et al. | |
| 2021/0352280 A1* | 11/2021 | Kang | H04N 19/105 |
| 2021/0400269 A1* | 12/2021 | Poirier | H04N 19/176 |
| 2022/0248017 A1* | 8/2022 | Lim | H04N 19/70 |

FOREIGN PATENT DOCUMENTS

| | | |
|---|---|---|
| CN | 102611880 A | 7/2012 |
| CN | 102763415 A | 10/2012 |
| CN | 104982035 A | 10/2015 |
| EP | 2039171 A1 | 3/2009 |
| EP | 2446627 A1 | 5/2012 |
| JP | 2009545920 A | 12/2009 |
| KR | 20120126106 A | 11/2012 |
| RU | 2571509 C2 | 12/2015 |
| WO | 2010151334 A1 | 12/2010 |
| WO | 2018149995 A1 | 8/2018 |
| WO | 2019083943 A1 | 5/2019 |
| WO | 2020094052 A1 | 5/2020 |
| WO | 2020142378 A1 | 7/2020 |

OTHER PUBLICATIONS

Bross et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Document: JVET-N1001-v10, Total 406 pages (Mar. 19-27, 2019).
Bross et al., "Versatile Video Coding (Draft 3)," Joint Video Experts Team (JVET) of ITU-T SG WP 3 and ISO/IEC JTC 1/SC 29/WG 11, 12th Meeting: Macao, CN, Document: JVET-L1001-v2, Total 173 pages (Oct. 3-12, 2018).
"Series H: Audiovisual and Multimedia Systems, Infrastructure of audiovisual services—Coding of moving video, High efficiency video coding," Recommendation of ITU-T H.265, ITU-T Telecommunication Standardization Sector of ITU, pp. 1-317, International Telecommunication Union, Geneva, Switzerland (Apr. 2013).
"Series H: Audiovisual and Multimedia Systems, Infrastructure of audiovisual services—Coding of moving video, Advanced video coding for generic audiovisual services," Recommendation of ITU-T H.264, ITU-T Telecommunication Standardization Sector of ITU, pp. 1-790, International Telecommunication Union, Geneva, Switzerland (Feb. 2014).
Guo et al., "CE2: Overlapped Block Motion Compensation for Geometry Partition Block," Joint Collaborative Team on Video Coding (JCT-VC) of ITU-T SG16 WP3 and ISO/IEC JTC1/SC29/WG11, 4th Meeting: Daegu, KR, Document: JCTVC-D368, total 5 pages (Jan. 20-28, 2011).
Toma et al., "Description of SDR video coding technology proposal by Panasonic," Joint Video Experts Team (JVET) of ITU-T SG 16 WP 3 and ISO/IEC JTC 1/SC 29/WG 11, Apr. 11, 2018, [JVET-J0020-v1] (version 2), total 6 pages (Apr. 10-20, 2018).
Bross et al., Versatile Video Coding (Draft 8), Joint Video Experts Team (JVET) of ITU-T SG WP 3 and ISO/IEC JTC 1/SC 29/WG 11, 17th Meeting, Brussels, BE, JVET-Q2001-vE (version 15), Total 6 pages, International Union of Telecommunication, Geneva, Switzerland (Jan. 7-17, 2020).
Chen et al., "Geometry Motion Partition," Joint Collaborative Team on Video Coding (JCT-VC) of ITU-T SG16 WP3 and ISO/IEC JTC1/SC29/WG11, 2nd Meeting: Geneva, CH, Document: JCTVC-B049, pp. 1-3 (Jul. 21-28, 2010).
Bross et al., "Versatile Video Coding (Draft 9)," Joint Video Experts Team (JVET) of ITU-T SG 16 WP 3 and ISO/IEC JTC 1/SC 29/WG11, 18th Meeting: by teleconference, Document: JVET-R2001-v1, Total 515 pages, XP030287927, Geneva, Switzerland (Apr. 15-24, 2020).
Ahn et al., "Diagonal motion partitions on top of QTBT block structure," Joint Video Exploration Team (JVET) of ITU-T SG 16 WP 3 and ISO/IEC JTC 1/SC 29/WG 11, 8th Meeting: Macao, CN, JVET-H0087, total 7 pages (Oct. 18-25, 2017).
Bläser et al., "Description of SDR and 360° video coding technology proposal by RWTH Aachen University," Joint Video Experts Team (JVET) of ITU-T SG 16 WP 3 and ISO/IEC JTC 1/SC 29/WG 11, 10th Meeting: San Diego, US, JVET-J0023-v1, total 19 pages (Apr. 10-20, 2018).
Ahn et al., "CE10-related: Diagonal motion partitions on top of MTT block structure," Joint Video Experts Team (JVET) of ITU-T SG 16 WP 3 and ISO/IEC JTC 1/SC 29/WG 11, 11th Meeting: Ljubljana, SI, JVET-K0270, total 10 pages (Jul. 10-18, 2018).
Liao et al., "CE10.3.1.b: Triangular prediction unit mode," Joint Video Exploration Team (JVET) of ITU-T SG 16 WP 3 and ISO/IEC JTC 1/SC 29/WG 11, 12th Meeting: Macao, CN, JVET-L0124-v1, total 7 pages (Oct. 3-12, 2018).
Esenlik et al., "Non-CE4: Geometrical partitioning for inter blocks," Joint Video Experts Team (JVET) of ITU-T SG 16 WP 3 and ISO/IEC JTC 1/SC 29/WG 11, 15th Meeting: Gothenburg, SE, JVET-O0489-v4, total 10 pages (Jul. 3-12, 2019).
JP/2023-118497, Office Action, Apr. 15, 2025.
U.S. Appl. No. 18/076,200, filed Dec. 6, 2022.
U.S. Appl. No. 17/154,788, filed Jan. 21, 2021.

* cited by examiner

ENCODER, DECODER AND CORRESPONDING METHODS FOR SUB-BLOCK PARTITIONING MODE

CROSS-REFERENCE TO RELATED APPLICATIONS

This application is a continuation of U.S. patent application Ser. No. 18/076,200, filed on Dec. 6, 2022, which is a continuation of U.S. patent application Ser. No. 17/154,788, filed on Jan. 21, 2021, now U.S. Pat. No. 11,539,948, which is a continuation of International Application No. PCT/CN2020/097032, filed on Jun. 19, 2020, which claims the priority to International Application No. PCT/EP2019/066432, filed Jun. 21, 2019. All of the aforementioned patent applications are hereby incorporated by reference in their entireties.

TECHNICAL FIELD

Embodiments of the present application (disclosure) generally relate to the field of picture processing and more particularly to prediction using sub-block partition modes.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

The first aspect of the present invention provides a method of coding implemented by a decoding device, the method comprising: obtaining a bitstream; obtaining a value of an indicator for a current block according to the bitstream; obtaining a value of a first parameter for the current block and a value of a second parameter for the current block, according to the value of the indicator and a predefined lookup table; obtaining a value of a sample distance for a sample which is located in the current block, according to the value of the first parameter and the value of the second parameter; and obtaining a prediction value for the sample, according to the value of the sample distance for the sample.

According to embodiments of the present invention, parameters for partitioning a block (e.g. an angle parameter, distance parameter . . . and so on) are stored in a predefined lookup table, hence, the actual values of these parameters do not need to be transmitted in a bitstream, and the values of these parameters are obtained according to an indication value coded in the bitstream. Thus, the coding efficiency can be improved.

As shown in FIG. 15, a method of coding implemented by a decoding device is disclosed, the method comprise:

S1501: obtaining a bitstream.

The bitstream may be obtained according to wireless network or wired network. The bitstream may be transmitted from a website, server, or other remote source using a coaxial cable, fiber optic cable, twisted pair, digital subscriber line (DSL), or wireless technologies such as infrared, radio, microwave, WIFI, Bluetooth, LTE or 5G.

In an embodiment, a bitstream is a sequence of bits, e.g. in the form of a network abstraction layer (NAL) unit stream or a byte stream, that forms the representation of a sequence of access units (AUs) forming one or more coded video sequences (CVSs).

In some embodiments, for a decoding process, a decoder side reads a bitstream and derives decoded pictures from the bitstream; for an encoding process, an encoder side produces a bitstream.

Normally, a bitstream will comprise syntax elements that are formed by a syntax structure. syntax element: An element of data represented in the bitstream.

syntax structure: Zero or more syntax elements present together in the bitstream in a specified order.

In a specific example, bitstream formats specify the relationship between the network abstraction layer (NAL) unit stream and byte stream, either of which are referred to as the bitstream.

The bitstream can be, for example, in one of two formats: the NAL unit stream format or the byte stream format. The NAL unit stream format is conceptually the more "basic" type. The NAL unit stream format comprises a sequence of syntax structures called NAL units. This sequence is ordered in decoding order. There are constraints imposed on the decoding order (and contents) of the NAL units in the NAL unit stream.

The byte stream format can be constructed from the NAL unit stream format by ordering the NAL units in decoding order and prefixing each NAL unit with a start code prefix and zero or more zero-valued bytes to form a stream of bytes. The NAL unit stream format can be extracted from the byte stream format by searching for the location of the unique start code prefix pattern within this stream of bytes.

This clause specifies an embodiment of the relationship between source and decoded pictures that is given via the bitstream.

The video source that is represented by the bitstream is a sequence of pictures in decoding order.

The source and decoded pictures are each comprised of one or more sample arrays:

Luma (Y) only (monochrome).

Luma and two chroma (YCbCr or YCgCo).

Green, blue, and red (GBR, also known as RGB).

Arrays representing other unspecified monochrome or tri-stimulus colour samplings (for example, YZX, also known as XYZ).

The variables and terms associated with these arrays are referred to as luma (or L or Y) and chroma, where the two chroma arrays are referred to as Cb and Cr; regardless of the actual colour representation method in use. The actual colour representation method in use can be indicated in syntax that is specified in VUI parameters as specified in ITU-T H.SEI|ISO/IEC 23002-7.

The variables SubWidthC and SubHeightC are specified in table 2, depending on the chroma format sampling structure, which is specified through sps_chroma_format_idc and sps_separate_colour_plane_flag.

TABLE 2

SubWidthC and SubHeightC values derived from sps_chroma_format_idc and sps_separate_colour_plane_flag

| sps_chroma_format_idc | sps_separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In monochrome sampling there is only one sample array, which is nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling, depending on the value of sps_separate_colour_plane_flag, the following applies:
- If sps_separate_colour_plane_flag is equal to 0, each of the two chroma arrays has the same height and width as the luma array.
- Otherwise (sps_separate_colour_plane_flag is equal to 1), the three colour planes are separately processed as monochrome sampled pictures.

S1502: obtaining a value of an indicator for a current block according to the bitstream.

In an embodiment, the value of the indicator is used to specify a partitioning shape of the geometric partitioning merge mode. For example, the indicator may be merge_gpm_partition_idx[x0][y0], wherein merge_gpm_partition_idx[x0][y0] specifies the partitioning shape of the geometric partitioning merge mode. The array indices x0, y0 specify the location (x0, y0) of the top-left luma sample of the considered coding block relative to the top-left luma sample of the picture.

Normally, the value of merge_gpm_partition_idx[x0][y0] is decoded from a bitstream. In an example, a value range for merge_gpm_partition_idx[ ][ ] is from 0 to 63, including 0 and 63. In an example, a decoding process for merge_gpm_partition_idx[ ][ ] is "bypass".

When merge_gpm_partition_idx[x0][y0] is not present, it is inferred to be equal to 0.

S1503: obtaining a value of a first parameter for the current block and a value of a second parameter for the current block, according to the value of the indicator and a predefined lookup table.

In one implementation, the first parameter represents an angle (or angular) for partitioning of the current block.

In one implementation, the second parameter represents a distance for partitioning of the current block.

In one implementation, the predefined lookup table comprises pairs of first and second parameters,
wherein when first parameter of a pair represents an angle corresponding to one of the angles of 0, 45, 90, 135, 180, 225, 270 or 315 degrees the corresponding second parameter of the pair does not represent a distance of zero samples from the center of the current block.

In one implementation, the predefined lookup table comprises pairs of first and second parameters,
wherein the first parameter of a pair represents an angle not corresponding to one of the angles of 0, 45, 90, 135, 180, 225, 270 or 315 degrees, and the corresponding second parameter of the pair represents a distance of zero samples from the center of the current block.

In one implementation, the predefined lookup table comprises pairs of first and second parameters,
wherein the first parameter of a pair represents an angle corresponding to one of the angles of 0, 45, 90, 135, 180, 225, 270 or 315 degrees, and the corresponding second parameter of the pair represents a distance of zero samples from the center of the current block.

In one implementation, wherein the second parameter specifies a distance index of a geometric partition, or the second parameter describes a distance of a separation line to the center of the current block.

In an embodiment, the partition angle variable angleIdx (parameter 1) and the distance variable distanceIdx (parameter 2) of the geometric partitioning mode are set according to the value of merge_gpm_partition_idx[xCb][yCb] (indicator) as specified in the following table. It could be understood that, in the implementation, this relationship can be implemented according to table 1 or according to a function.

TABLE 1

Specification of angleIdx and distanceIdx based on merge_gpm_partition_idx.

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |

| merge_gpm_partition_idx | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |

| merge_gpm_partition_idx | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |

TABLE 1-continued

Specification of angleIdx and distanceIdx based on merge_gpm_partition_idx.

| merge_gpm_partition_idx | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

S1504: obtaining a value of a sample distance for a sample which is located in the current block, according to the value of the first parameter and the value of the second parameter.

In an embodiment, this step comprises:

Step 3.1: obtain an index value of an angle parameter (alphaN or angleIdx) for the current block, a value of a width of the current block (W), a value of a height of the current block (H). The W and H are width and height of the current block in number of samples. For example, a coding block with width and height both equal to 8 is a square block that comprises 64 samples. In another example, the W and H are width and height of the current block, in number of luma samples. The index value of the angle parameter may be obtained according to the above description referring to table 1.

Step 3.2: obtaining a value of a ratio whRatio according to the value of W and the value of H, the value of whRatio representing a ratio between the width and height of the current coding block.

In an example, whRatio=H/W; or whRatio=W/H.

In another example, two variables nCbW and nCbH specify the width and the height of the current coding block, and a variable cIdx specifies a colour component index.

variables nW, nH and whRatio are derived as follows:

```
nW = ( cIdx  = =  0 ) ? nCbW : nCbW * SubWidthC;
nH = ( cIdx  = =  0 ) ? nCbH : nCbH * SubHeightC;
whRatio = nH / nW.
```

In an example, the variables SubWidthC and SubHeightC are specified in table 2.

Step 3.3: Obtain a shiftHor value according to a lookup table, the value of the alpha and the value of the whRatio, in an example, the value of the alpha (alphaN or angleIdx) and the value of the whRatio are used as index values of the lookup table. The shiftHor value can also be obtained according to a function, wherein the value of the alpha (alphaN or angleIdx) and the value of the whRatio are the input to the function and the shiftHor value is the output of the function. In an example, the result of the function is similar or same as the lookup table. In an example, the shiftHor value represents a quantization step size for the sample distance calculation process.

In another example, the function may be represented by shiftHor = ( angleIdx % 16 == 8 || ( angleIdx % 16 != 0 && whRatio >0)) ? 0 : 1.

Step 3.4: a value of the sample_dist is calculated according to the shiftHor value.

In an example, for calculating sample distance (sample_dist), first, variables offsetX and offsetY are derived as follows:

If shiftHor is equal to 0, the following applies:

```
offsetX = ( -nW ) >> 1,
offsetY = ( ( -nH ) >> 1 ) +
    ( angleIdx < 16 ? ( distanceIdx * nH ) >> 3 : -
    ( ( distanceIdx * nH ) >> 3 ) );
```

Otherwise (shiftHor is equal to 1), the following applies:

```
offsetX = ( ( -nW ) >> 1 ) +
    ( angleIdx < 16 ? ( distanceIdx * nW ) >> 3 : -
    ( ( distanceIdx * nW ) >> 3 ) );
offsetY = ( - nH ) >> 1;
```

The variables xL and yL are derived as follows:

```
xL = ( cIdx  = =  0 ) ? x : x * SubWidthC
yL = ( cIdx  = =  0 ) ? y : y * SubHeightC
sample_dist = ( ( ( xL + offsetX ) << 1 ) + 1 ) * disLut[
    displacementX ] + ( ( ( yL + offsetY ) << 1 ) + 1 ) ) *
    disLut[ displacementY ].
```

The variables displacementX and displacementY are derived as follows:

```
hwRatio = cbHeight / cbWidth;
displacementX = angleIdx;
displacementY = ( angleIdx + 8 ) % 32.
```

The array disLut is specified in below table 3.

In some embodiments, according to a geometric model, samples in a coding block are considered as located in two sub-blocks. Sub-block A or sub-block B may comprise a part (but not all) of the samples in the current coding block. Sub-block A or sub-block B may be represented according to the sign of a sample_dist of each samples. The sample_dist may be obtained according to the examples and embodiments in the other paragraphs.

S1505: obtaining a prediction value for the sample, according to the value of the sample distance for the sample.

In one implementation, the obtaining a prediction value for the sample, according to the value of the sample distance for the sample, comprises:
  calculating two weighting factors according to the sample distance value; and
  obtaining the prediction value for the sample according to a first prediction value, a second prediction value and the two weighting factors.

In one implementation, the value of the sample distance represents the horizontal distance or the vertical distance, or a combination of the vertical and horizontal distances, of the said sample to a separation line, wherein the separation line is used to divide a coding block into two sub-blocks.

In one example, the calculated sample_dist is used to calculate weighting factors, the weighting factors are used for the combination of a first prediction value and a second prediction value corresponding to the said sample. In an example, the weighting factors are denoted as sampleWeight1 and sampleWeight2, referring to the weight corresponding to the first prediction value and the weight corresponding to the second prediction value.

In one example, weighting factors are calculated according to the following functions, weightIdxL = partFlip ? 32 + sample_dist : 32 − sample_dist;
wValue = Clip3( 0, 8, ( weightIdxL + 4 ) >> 3 ).

In this example, wValue is sample Weight1, and 8-wValue is sampleWeight2. The variable partFlip is determined according to a value of angleIdx. In an example, partFlip=(angleIdx>=13 && angleIdx<=27)?0:1, or partFlip=(angleIdx>=13 && angleIdx<=27)?1:0.

In one example, the combined value of the prediction sample at the sample coordinate (x,y) is calculated according to, the first prediction value at coordinate (x,y), the second prediction value at coordinate (x,y), the sampleWeight1 and the sampleWeight2.

In an example, the prediction sample value is derived as follows:

pbSample[ x ][ y ] = Clip3( 0, ( 1 << BitDepth ) − 1,
( predSamplesLA[ x ][ y ] * wValue +
predSamplesLB[ x ][ y ] * ( 8 − wValue ) + offset1 ) >> shift1 ).

Wherein bitDepth represents sample bit depth, variable shift1 is obtained according to the bitDepth, in an example, shift1=Max(5, 17−BitDepth); Variable offset1 is obtained according to the shift1, in an example, offset1=1<<(shift1−1), predSamplesLA and predSamplesLB are two (nCbW)×(nCbH) arrays.

In one embodiment, a method of coding implemented by an encoding device is disclosed, the method comprising: selecting a value of a first parameter and a value of a second parameter;
obtaining an index value according to the value of the first parameter, the value of the second parameter and a lookup table; and encoding the index value into a bitstream.

The details for each step at the encoder side correspond to the above examples at the decoder side.

As shown in FIG. 16, the second aspect of the present invention provides a decoding device 1600, the decoding device comprising:
a receiving module 1601, which is configured to obtain a bitstream and obtain a value of an indicator for a current block according to the bitstream;
a partition parameters process module 1602, which is configured to obtain a value of a first parameter for the current block and a value of a second parameter for the current block, according to the value of the indicator and a predefined lookup table;
a calculating module 1603, which is configured to obtain a value of a sample distance for a sample which is located in the current block, according to the value of the first parameter and the value of the second parameter; and
a prediction module 1604, which is configured to obtain a prediction value for the sample, according to the value of the sample distance for the sample.

The method according to the first aspect of the invention can be performed by the apparatus according to the second aspect of the invention. Further features and implementation forms of the above methods correspond to the features and implementation forms of the apparatus according to the second aspect of the invention.

In an embodiment, a decoder (30) or an encoder (20) comprising processing circuitry for carrying out the method according to any one of the above embodiments and implementation is disclosed.

In an embodiment, a computer program product comprising a program code for performing the method according to any one of the above embodiments and implementation is disclosed.

In an embodiment, a decoder or an encoder, comprising:
one or more processors; and
a non-transitory computer-readable storage medium coupled to the processors and storing programming for execution by the processors, wherein the programming, when executed by the processors, configures the decoder or the encoder to carry out the method according to any one of the above embodiments and implementation is disclosed In an embodiment, a non-transitory storage medium which includes an encoded bitstream decoded by an image decoding device, the bit stream being generated by dividing a frame of a video signal or an image signal into a plurality blocks, and including a plurality of syntax elements, wherein the plurality of syntax elements comprises an indicator (syntax) according to any one of the above embodiments and implementation is disclosed.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which.

Figure 1A:
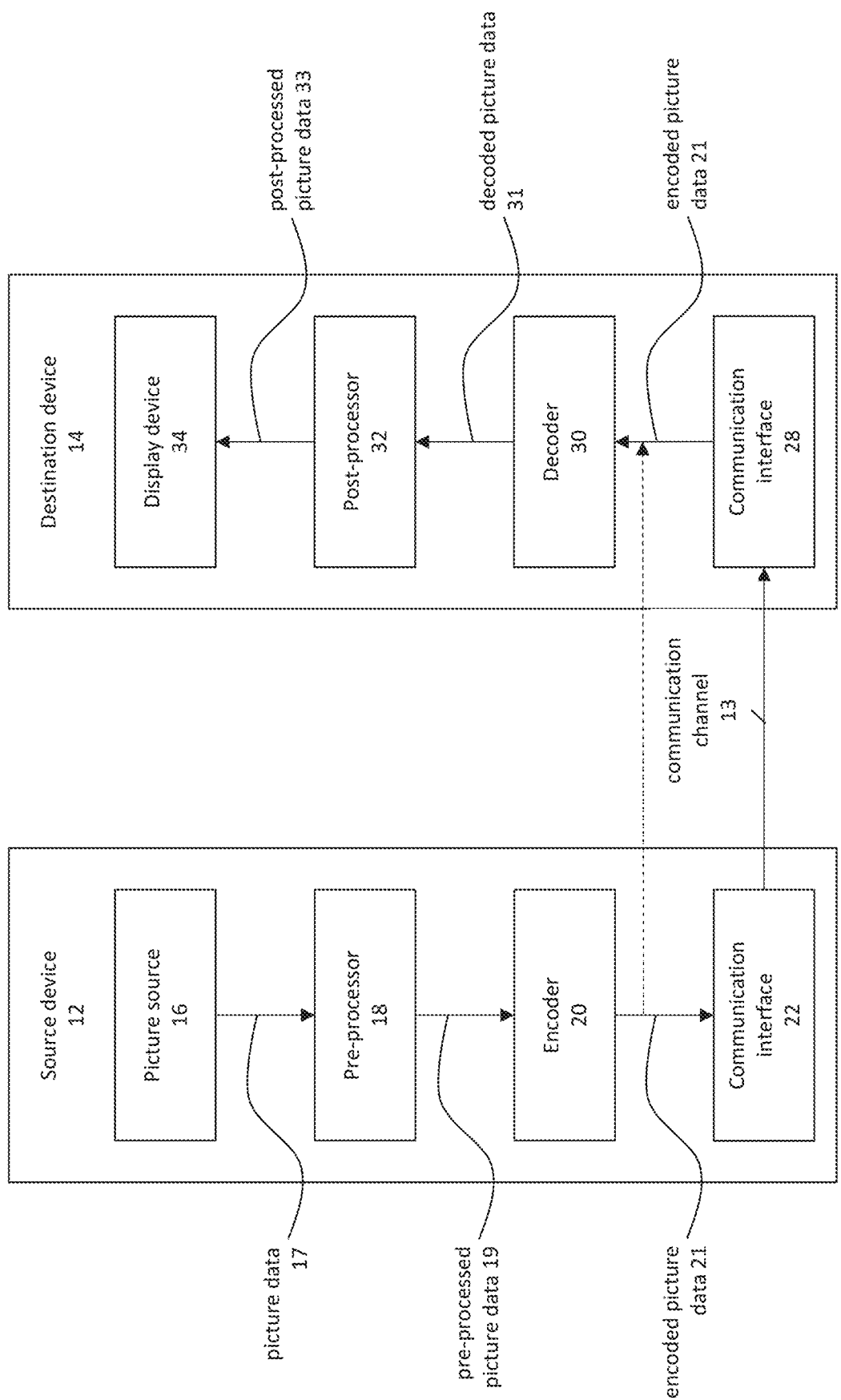
FIG. 1A is a block diagram showing an example of a video coding system configured to implement embodiments of the invention.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
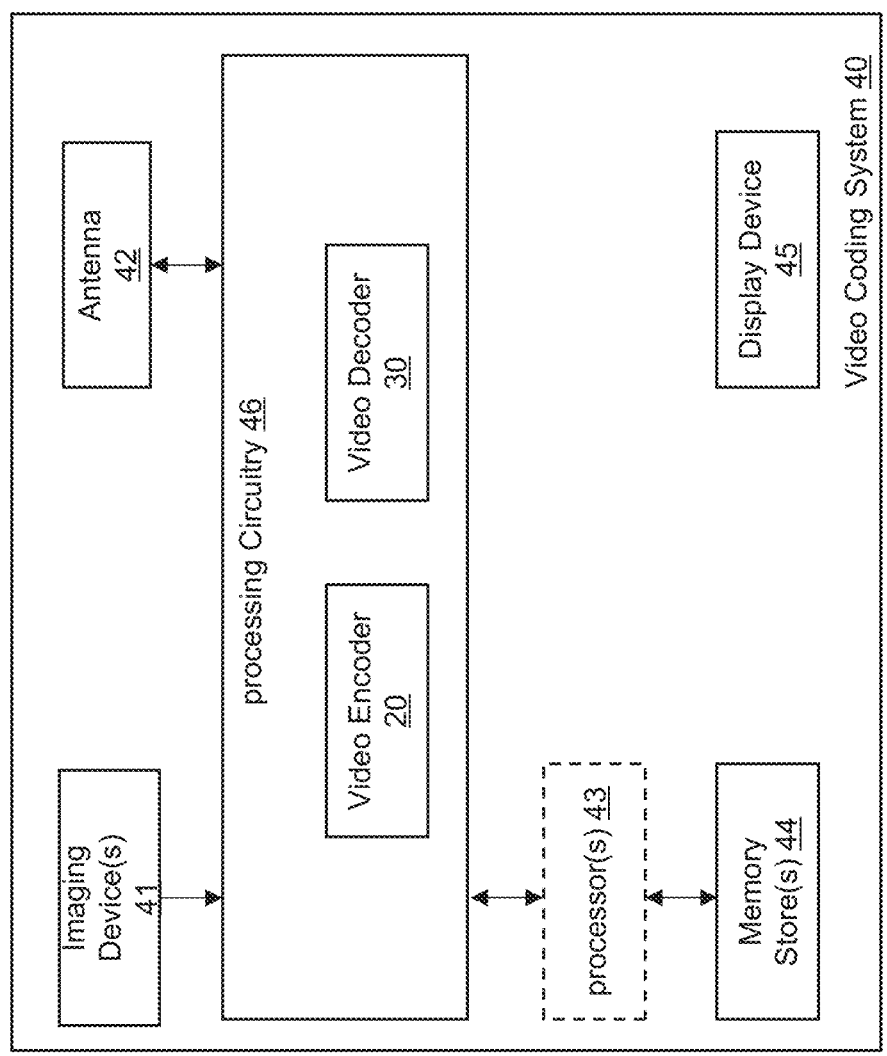
FIG. 1B is a block diagram showing another example of a video coding system configured to implement embodiments of the invention.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices(such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the invention are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

Encoder and Encoding Method

Figure 2:
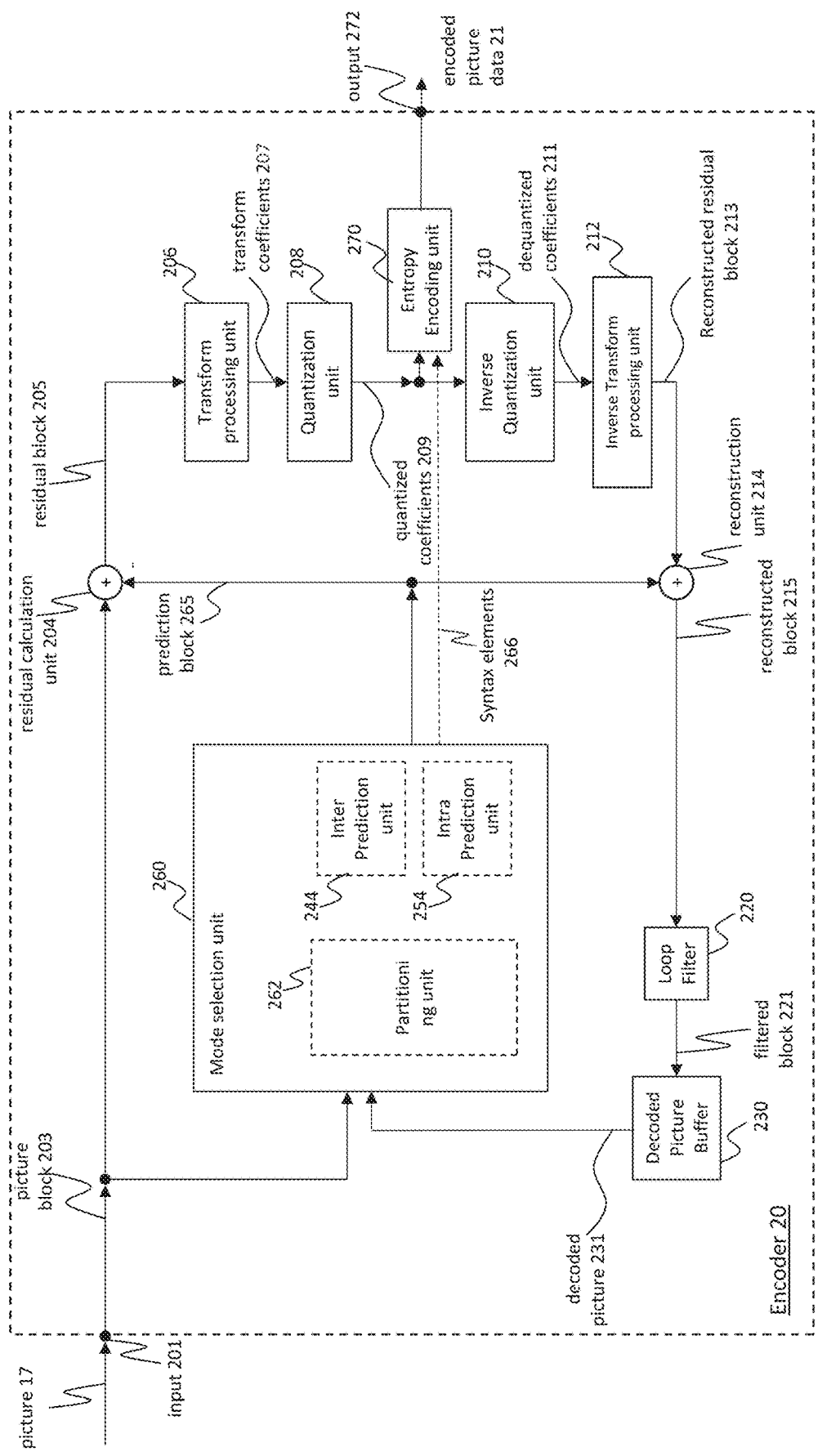
FIG. 2 is a block diagram showing an example of a video encoder configured to implement embodiments of the invention.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
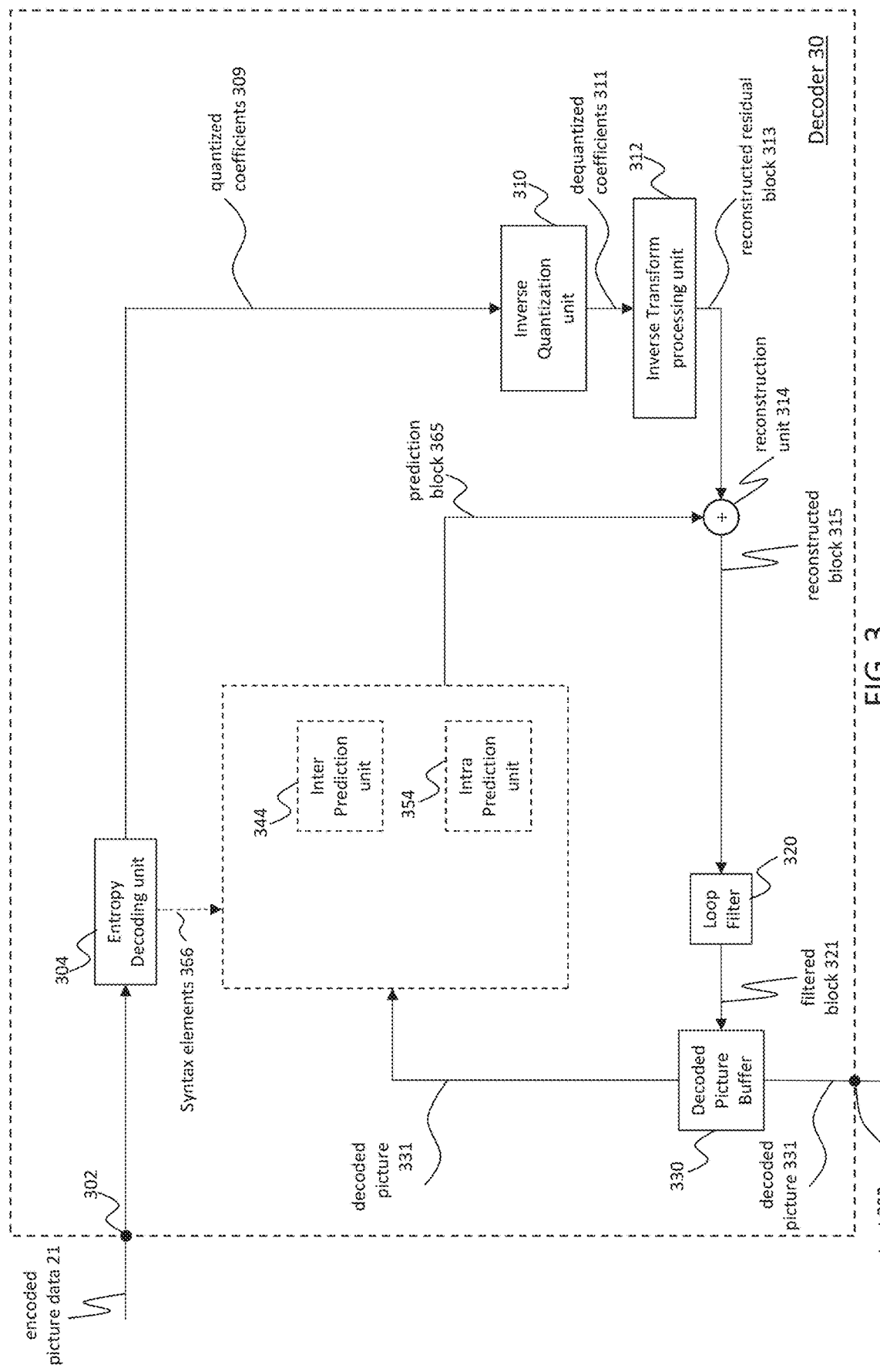
FIG. 3 is a block diagram showing an example structure of a video decoder configured to implement embodiments of the invention.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g. the encoding and prediction is performed per block 203.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. trec-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.
Intra-Prediction The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.
Inter-Prediction The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice.
Entropy Coding The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{(bitDepth-1)} \sim 2^{(bitDepth-1)}-1$, where "^" means exponentiation. For example, if bitDepth is set equal to 16, the range is $-32768 \sim 32767$; if bitDepth is set equal to 18, the range is $-131072 \sim 131071$. Here provides two methods for constraining the motion vector.

Method 1: Remove the Overflow MSB (Most Significant Bit) by Flowing Operations $$ux = \left(mvx + 2^{bitDepth}\right) \% \ 2^{bitDepth} \qquad (1)$$

$$mvx = \left(ux >= 2^{bitDepth-1}\right)?\left(ux - 2^{bitDepth}\right):ux \qquad (2)$$

$$uy = \left(mvy + 2^{bitDepth}\right) \% \ 2^{bitDepth} \qquad (3)$$

$$mvy = \left(uy >= 2^{bitDepth-1}\right)?\left(uy - 2^{bitDepth}\right):uy \qquad (4)$$

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111, 1111,1111 (decimal number is 32767), which is same as the output by applying formula (1) and (2).

$$ux = \left(mvpx + mvdx + 2^{bitDepth}\right) \% \ 2^{bitDepth} \qquad (5)$$

$$mvx = \left(ux >= 2^{bitDepth-1}\right)?\left(ux - 2^{bitDepth}\right):ux \qquad (6)$$

$$uy = \left(mvpy + mvdy + 2^{bitDepth}\right) \% \ 2^{bitDepth} \qquad (7)$$

$$mvy = \left(uy >= 2^{bitDepth-1}\right)?\left(uy - 2^{bitDepth}\right):uy \qquad (8)$$

The operations may be applied during the sum of mvp and mvd, as shown in formula (5) to (8).
Method 2: Remove the Overflow MSB by Clipping the Value $$vx = \text{Clip3}\left(-2^{bitDepth-1}, 2^{bitDepth-1} - 1, vx\right)$$

$$vy = \text{Clip3}\left(-2^{bitDepth-1}, 2^{bitDepth-1} - 1, vy\right)$$

where the definition of function Clip3 is as follow:

$$\text{Clip3}(x, y, z) = \begin{cases} x & ; \quad z < x \\ y & ; \quad z > y \\ z & ; \quad \text{otherwise} \end{cases}$$

The operation "?" is usually used as a shortcut to represent "if . . . else" condition. For example "X<K?X=1:X=0" can be interpreted as "if X is smaller than K, X is set equal to 1, else (if X is not smaller than K) X is set equal to 0".

Figure 4:
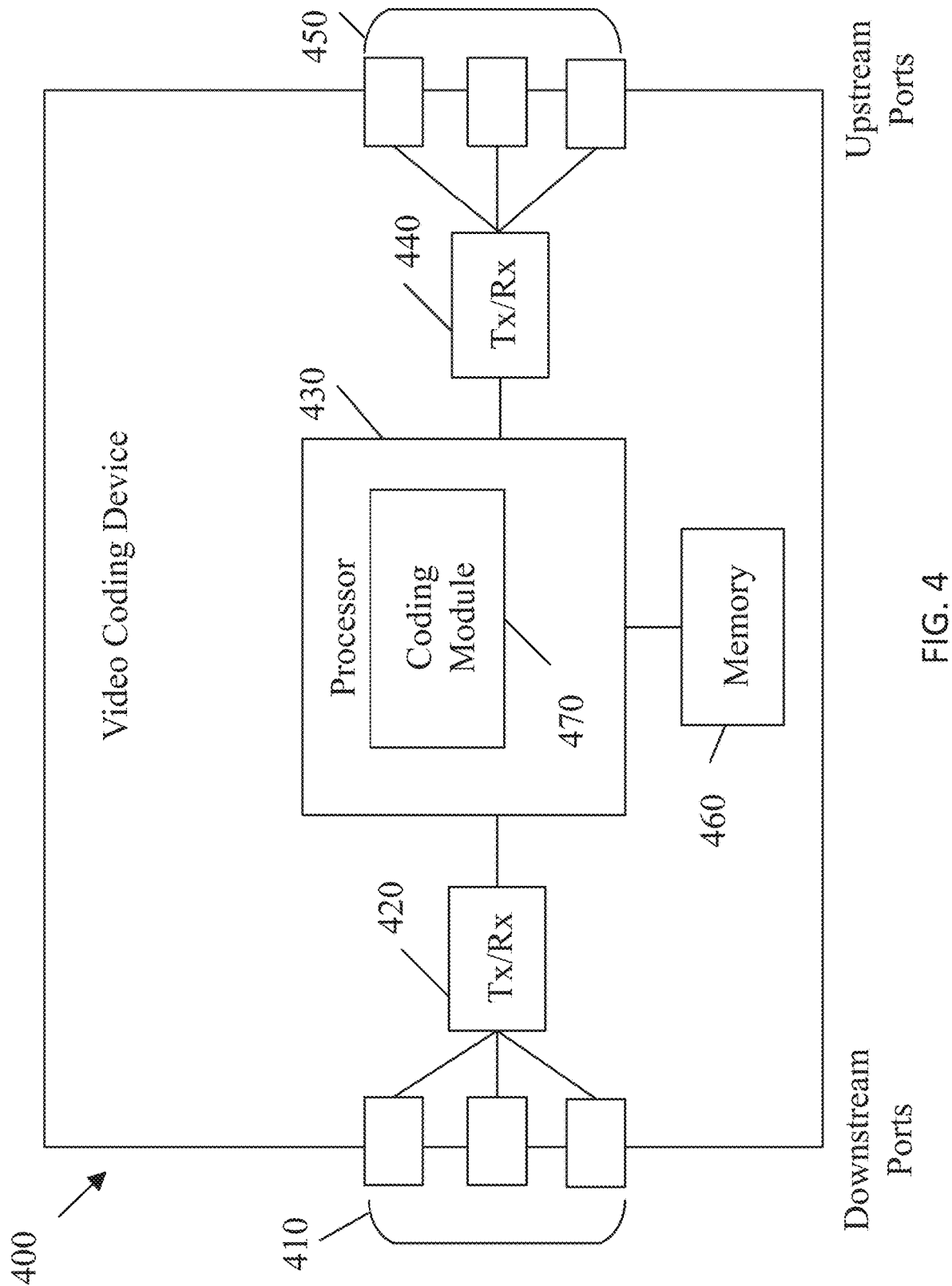
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an over-flow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
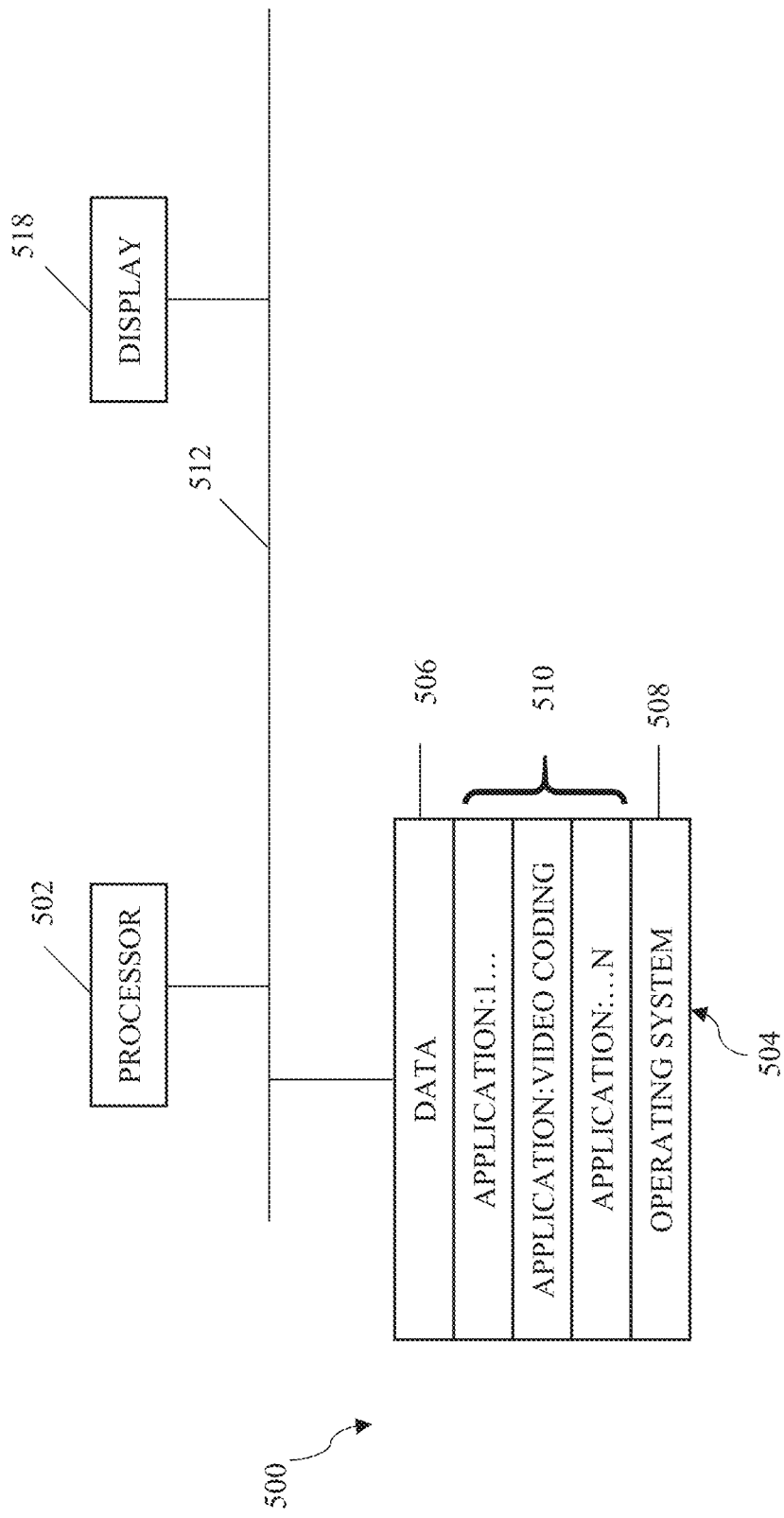
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

In an example about Merge Candidate List Construction according to ITU-T H.265, a merge candidate list is constructed based on the following candidates:
1. up to four spatial candidates that are derived from five spatial neighboring blocks,
2. one temporal candidate derived from two temporal, co-located blocks,
3. additional candidates including combined bi-predictive candidates and,
4. zero motion vector candidates.

Spatial Candidates

Figure 6B:
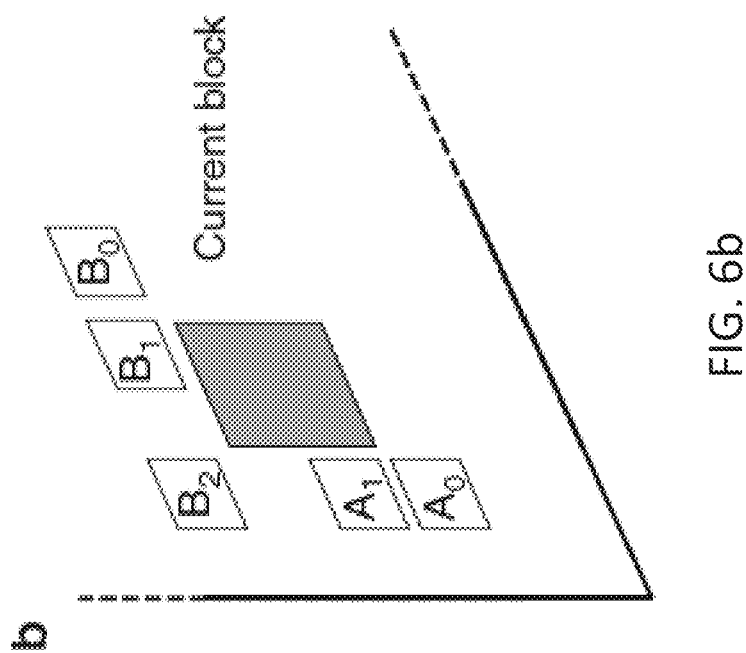
FIG. 6b illustrated an example of spatial neighbor blocks.

The motion information of spatial neighbor blocks are first added into the merge candidate list (in an example, the merge candidate list may be an empty list before the first motion vector is added into the merge candidate list) as motion information candidates. Here, the neighboring blocks that are considered to be inserted in the merge list are illustrated in FIG. 6b. For inter-prediction block merging, up to four candidates are inserted in the merge list by sequentially checking A1, B1, B0, A0 and B2, in that order.

Motion information may contains all motion data including the information whether one or two reference picture lists are used as well as a reference index and a motion vector for each reference picture list.

In an example, after checking whether a neighboring block is available and contains motion information, some additional redundancy checks are performed before taking all the motion data of the neighboring block as a motion information candidate. These redundancy checks can be divided into two categories for two different purposes:
  Category 1, avoid having candidates with redundant motion data in the list,
  Category 2, prevent merging two partitions that could be expressed by other means which would create redundant syntax.

Temporal Candidates

Figure 6A:
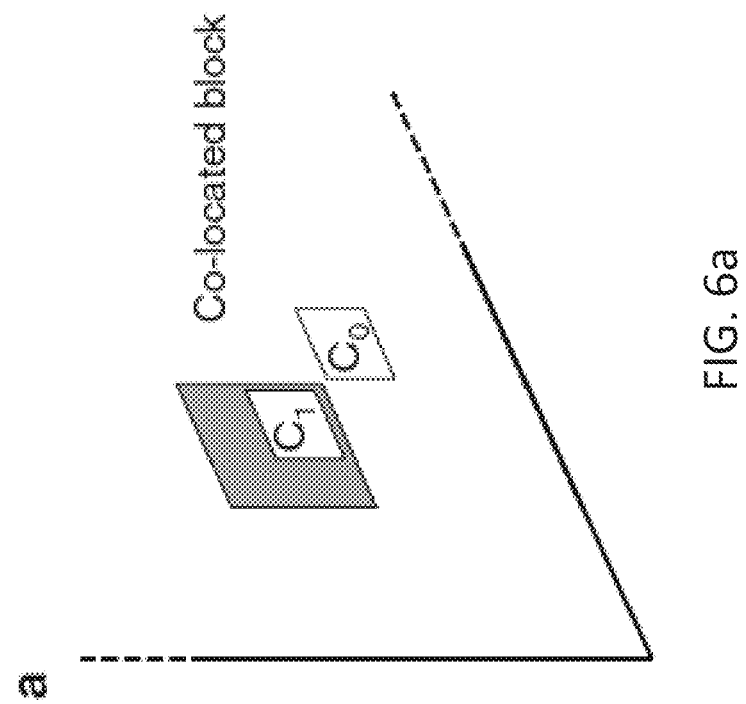
FIG. 6a illustrated an example of Co-located block.

The FIG. 6a illustrated the coordinates of the blocks where temporal motion information candidates are retrieved from. Collocated block is the block that has the same $-x$, $-y$ coordinates of the current block, but is on a different picture (one of the reference pictures). The temporal motion information candidates are added to the merge list if the list is not full (in an example, the merge list is not full when a quantity of candidates in the merge list is smaller than a threshold, for example, the threshold may be 4, 5, 6, and so on).

Generated Candidates

After insertion of spatial and temporal motion information candidates, if the merge list is still not full, generated candidates are added to fill the list. The list size is indicated in the sequence parameter set and is fixed throughout the whole coded video sequence.

Bi-Prediction

A special mode of inter prediction is called "bi-prediction", where 2 motion vectors are used to predict a block. The motion vectors can point to same or different reference pictures, where a reference picture can be indicated by a reference picture list ID and a reference picture index. For example a first motion vector might point to a first picture in the reference picture list L0 and a second motion vector might point to a first picture in the reference picture list L1. Two reference picture lists (for example, L0 and L1) might be maintained and the picture pointed by the first motion vector is selected from list L0 and the picture pointed by the second motion vector is selected from list L1.

In an example, if a motion information indicates bi-prediction, then the motion information includes two parts:

L0 part: A motion vector and a reference picture index that points to an entry in the reference picture list L0.

L1 part: A motion vector and a reference picture index that points to an entry in the reference picture list L1.

Picture Order Count (POC): A variable that is associated with each picture, uniquely identifies the associated picture among all pictures in the CVS (Coded Video Sequence), and, when the associated picture is to be output from the decoded picture buffer, indicates the position of the associated picture in output order relative to the output order positions of the other pictures in the same CVS that are to be output from the decoded picture buffer.

Each of the reference picture lists L0 and L1 might include one or more reference pictures each of which is identified with a POC. The association with each reference index and the POC value might be signaled in the bitstream. As an example the L0 and L1 reference picture lists might include the following reference pictures:

| Reference Picture List | Reference Index | POC |
| --- | --- | --- |
| L0 | 0 | 12 |
| L0 | 1 | 13 |
| L1 | 0 | 13 |
| L1 | 1 | 14 |

In the example above, the first entry (indicated by reference index 0) in reference picture list L1 is the reference picture with POC value 13. The second entry (indicated by reference index 1) in reference picture list L1 is the reference picture with POC value 14.

The merge list construction process in ITU-T H.265 and in VVC outputs a list of motion information candidates. The merge list construction process of VVC is described in the "8.3.2.2 Derivation process for luma motion vectors for merge mode" section of the document JVET-L1001_v2 Versatile Video Coding (Draft 3), which is publicly available under http://phenix.it-sudparis.eu/jvet/. The term motion information refers to the motion data that is necessary to perform motion compensated prediction process. The motion information usually refers to the following information:

Whether the block applies uni-prediction or bi-prediction.

The ID of the reference picture that is used in the prediction (2 IDs if block applies bi-prediction).

Motion vector (2 motion vectors if block is bi-predicted).

Additional information.

In VVC and H.265, the list of candidates that are output of the merge list construction include N candidate motion information. The number N is typically included in the bitstream and can be a positive integer number such as 5, 6 etc. The candidates that are included the in the constructed merge list might include uni-prediction information or bi-prediction information. This means that the candidate that is selected from the merge list might indicate a bi-prediction operation.

Triangular Prediction Mode

Figure 7:
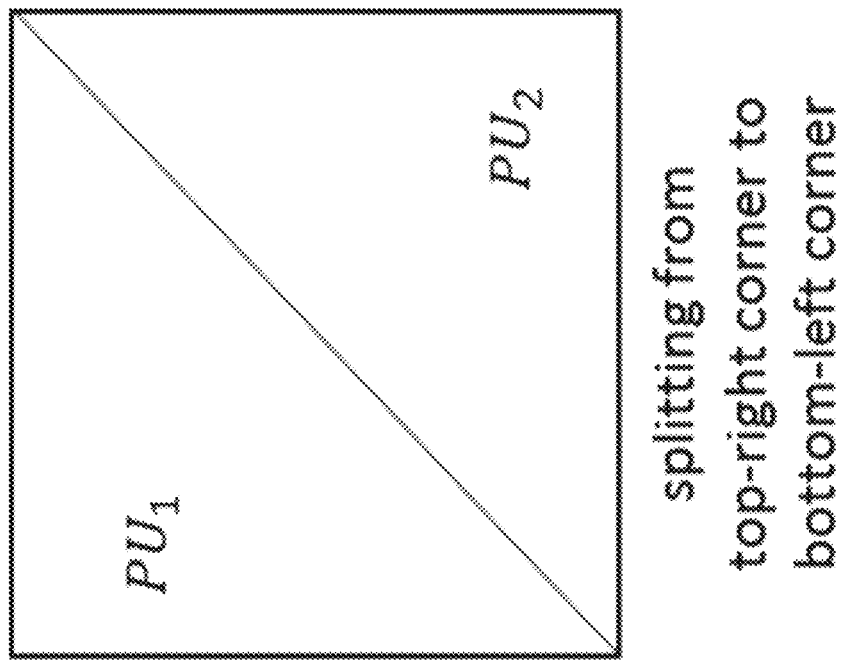
FIG. 7 illustrated some examples of triangular prediction mode.
Figure 7:
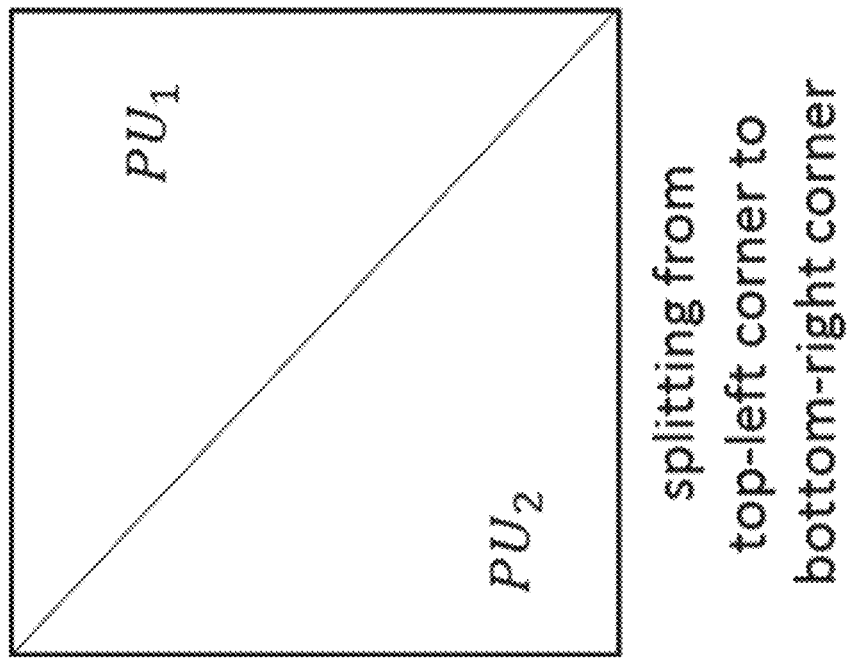

The concept of the triangular prediction mode is to introduce a new triangular partition for motion compensated prediction. As shown in FIG. 7, two triangular prediction units are used for a CU, in either diagonal or inverse diagonal direction. Each triangular prediction unit for the CU is inter-predicted using uni-prediction motion vector and reference frame index, which are derived from a uni-prediction candidate list. An adaptive weighting process is performed to the diagonal edge after the samples that are associated with each triangular prediction unit have been predicted for example by motion-compensation or intra-picture prediction. Then, the transform and quantization process are applied to the whole CU. It is noted that this mode is only applied to skip mode and merge mode.

In the triangular prediction mode a block is split into two triangular parts (as in FIG. 7), and each part can be predicted using one motion vector. A motion vector which is used to predict one triangle part (denoted with PU1) can be different from a motion vector which is used to predict the other triangle part (denoted with PU2). In an example, it is noted that each part may be predicted only using a single motion vector (uni-predicton), in order to reduce the complexity of performing the triangle prediction mode. In other words, the PU1 and PU2 may not be predicted using bi-prediction, which comprises two motion vector.

Sub-Block Prediction Mode

Figure 8:
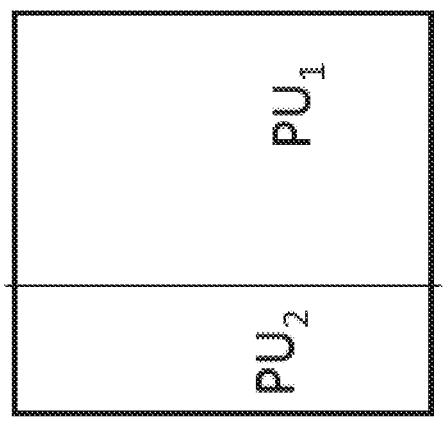
FIG. 8 illustrated some examples of Sub-block prediction mode.
Figure 8:
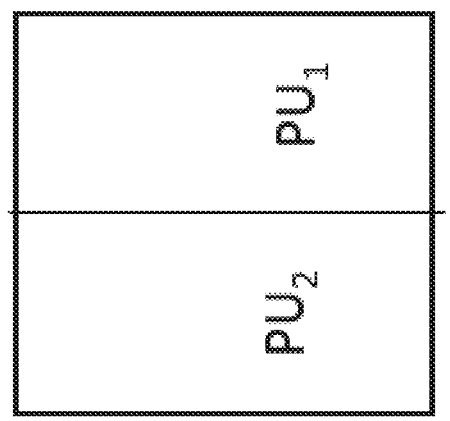
Figure 8:
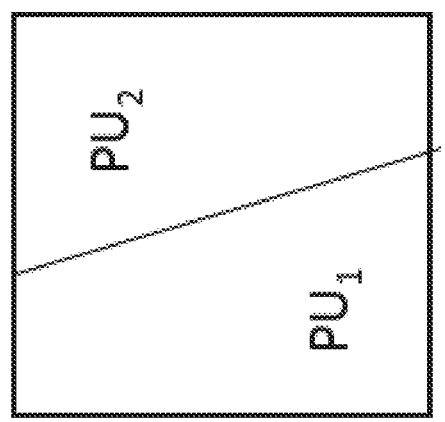

Triangular prediction mode is a special case of sub-block prediction, where a block is divided into two blocks. In the above examples, two block division directions are illustrated (45 degree and 135 degree partitions.). Other partition angles and partition proportions for sub-block prediction are also possible (examples in FIG. 8).

In some examples, the block is split into 2 sub-blocks, and each part (sub-block) is predicted with uni-prediction.

In an example, according to use sub-block partition mode, the following steps are applied to obtain prediction samples for a block:

Step 1: divide a coding block into 2 sub-blocks, according to a geometric model. This model may result in the splitting of the block by a separation line (for example, a straight line) as exemplified in FIG. 9-12.

It could be understand that, the result of Step 1 may be just concept. For example, there is no express concept "sub-block 1" or "sub-block 2" after the Step 1; but generate or obtain parameters refer to the separation line. Samples are belong to different sub-blocks according to the parameters refer to the separation line.

In this step, according to a geometric model, samples in a coding block are considered as located into two sub-blocks. Sub-block A or sub-block B comprises part (but not all) of samples in the current coding block. Sub-block A or sub-block B may be represented according to the sign of a sample_dist of each samples. The sample_dist may be obtained according to the examples and embodiments in the other paragraphs.

Step 2: obtain a first prediction mode for a first sub-block and a second prediction mode for a second sub-block. In an example, the first prediction mode is not identical to the second prediction mode. In an example, a prediction mode (first prediction mode or second prediction mode) may be an inter prediction mode, information for an inter prediction mode may comprises a reference picture index and a motion vector. In another example, the prediction mode may be an intra prediction mode, information for an intra prediction mode may comprises an intra prediction mode index.

Step 3: Obtain first prediction values and second prediction values, using the first prediction mode and second prediction mode, respectively.

Step 4: obtain the combined values of prediction samples according to combine the first prediction values and the second prediction values, according to the division which is disclosed in Step 1. The process of combining samples from the first prediction and the second prediction to obtain the combined values of prediction samples of a block may comprise filtering operations, masking operations or copying of samples.

Figure 9:
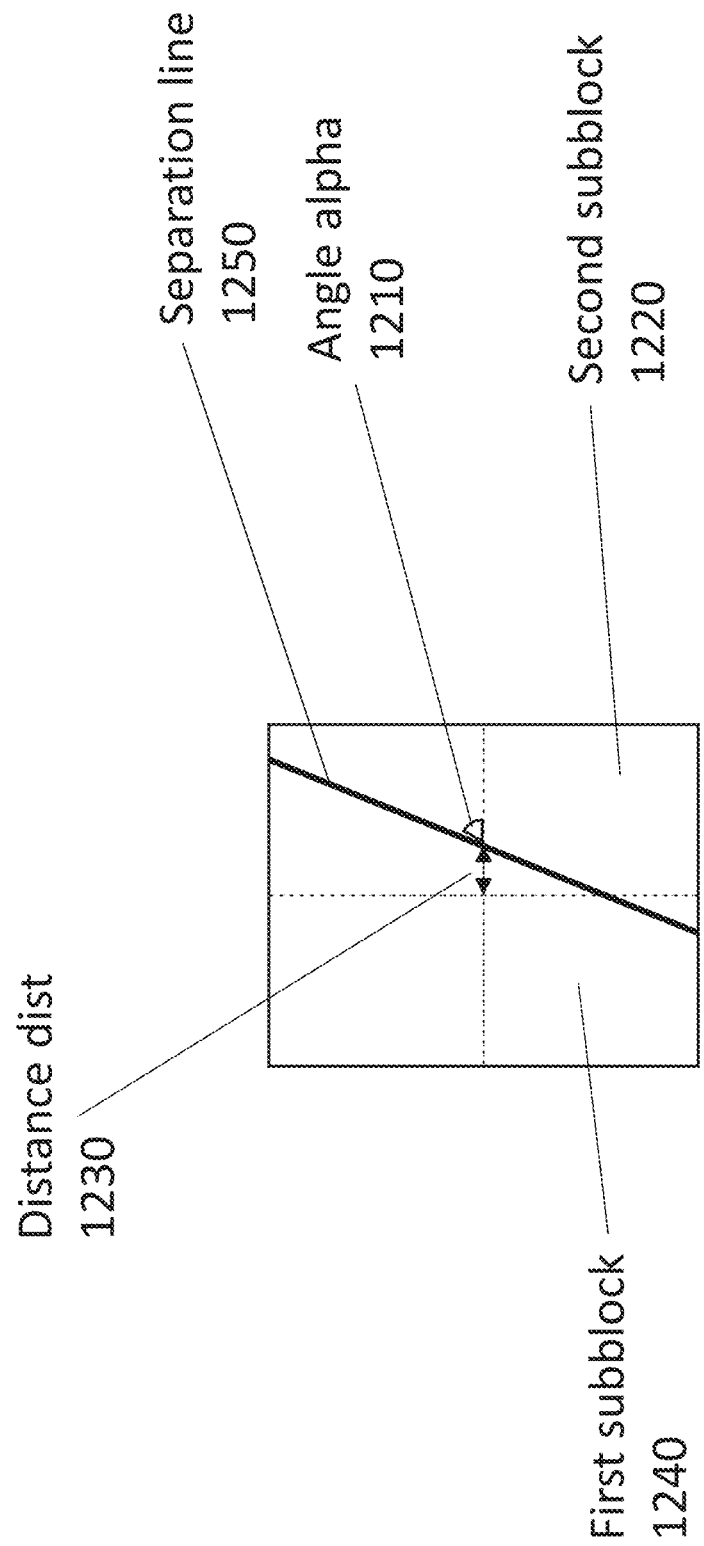
FIG. 9-12 show some examples about partition of a block.

In an example, in step 1, a coding block is divided into 2 sub-blocks in various ways. FIG. 9 shows an example about partition of a coding block, the separation line 1250 divides the block into 2 sub-blocks. In order to describe the line 1250, two parameters are signalled, one parameter is angle alpha 1210 and the other parameter is distance dist 1230.

In some embodiments, the angle, as indicated in FIG. 9, is measured between the x-axis and the separation line, whereas the distance is measured by the length of the vector which is perpendicular to the separation line and passing through the center of the current block.

Figure 10:
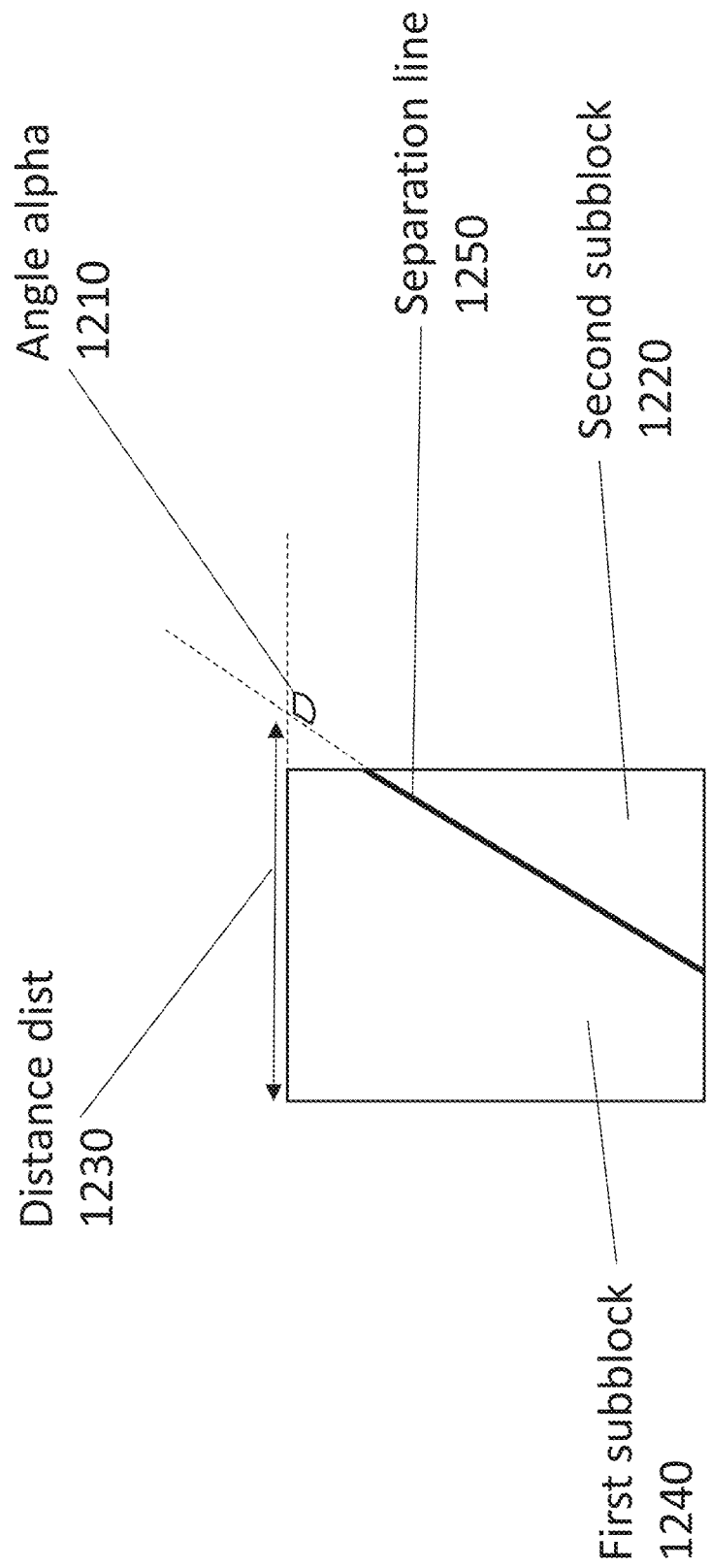
Figure 11:
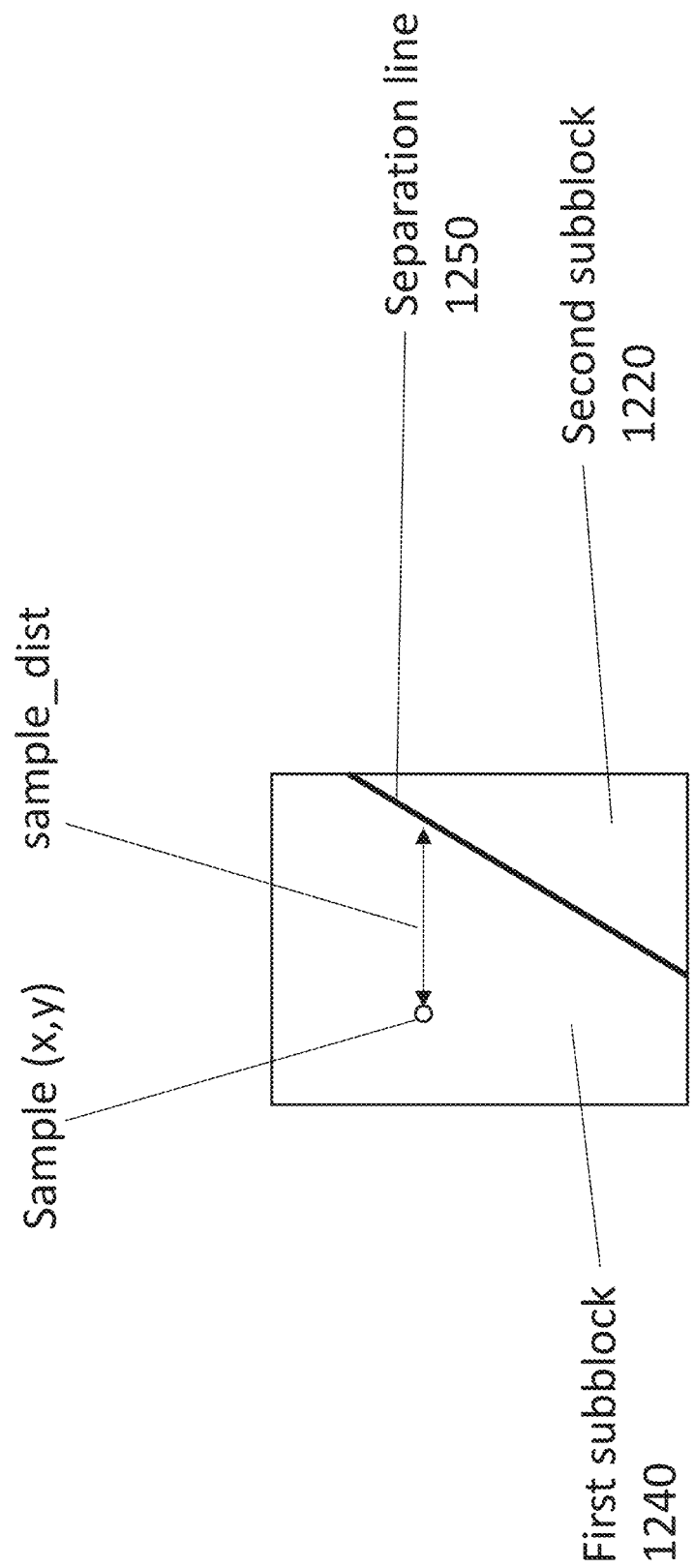
Figure 12:
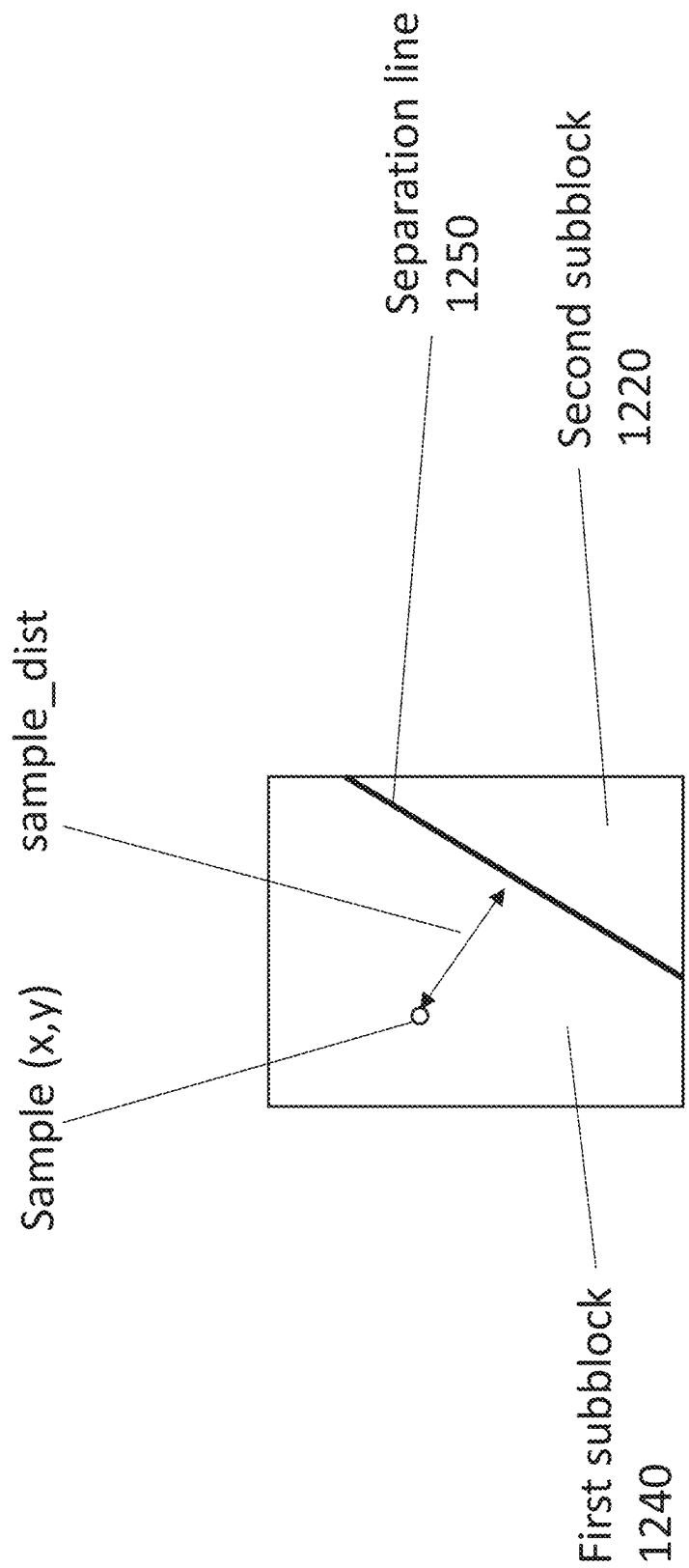

In another example, FIG. 10 shows an alternative way of representing the separation line, where the examples of the angle and the distance are different with the examples showed in FIG. 9.

In some example, in step 4, the division disclosed in Step 1 is used for the combination of the two said predictions, to obtain the final prediction. In an example, a blending operation is applied in step 4 in order to eliminate any artefacts (edgy or jugged appearance along the separation line). The blending operation can be described as a filtering operation along the separation line.

In an example, in the encoder side, a separation line (the parameters defining the line, e.g. the angular and distance) is determined based on a rate-distortion based cost function. The determined line parameters are encoded into the bitstream. In the decoder side, the line parameters are decoded (obtained) according to the bitstream. In the decoder side, the line parameters are used for the combination of the first prediction values and second prediction values, to obtain the final prediction values. The Step 1 does not require that there are two sub-coding block concepts, the decoder can use a coding block and the line parameters to represent two sub-coding block concepts.

As there are many possibilities of dividing a coding block into 2 sub-blocks, the signaling (coding) of the division requires too many bits. And as the angle and distance values can have many different values, which require too much side information to be signaled in a bitstream.

Embodiments of the present invention are about signalling of the partitioning parameters. The efficient coding is achieved by the following features:

Parameters (e.g. angle and distance) for partitioning of a block are stored in a predetermined table, such that the actual values of angle and distance do not need to be transmitted.

The table contains partitioning parameters that are more likely and that include enough variation.

An index to the table is encoded into (or obtained from) a bitstream.

Embodiments of the invention achieves a way of jointly coding the parameters that describe the partitioning of a coding block into sub-blocks.

Embodiment 1 (Decoder Perspective)

In this embodiment, the following steps are applied to obtain the combined prediction value of a sample of a coding block.

Step 1: Obtain a value of an indicator for a current decoding block according to a bitstream.

In an embodiment, the value of the indicator is used to specify a partitioning shape of the geometric partitioning merge mode. For example, the indicator may be merge_gpm_partition_idx[x0][y0], wherein merge_gpm_partition_idx[x0][y0] specifies the partitioning shape of the geometric partitioning merge mode. The array indices x0, y0 specify the location (x0, y0) of the top-left luma sample of the considered coding block relative to the top-left luma sample of the picture.

Normally, the value of merge_gpm_partition_idx[x0][y0] is decoded from a bitstream. In an example, a value range for merge_gpm_partition_idx[ ][ ] is from 0 to 63, including 0 and 63. In an example, a decoding process for merge_gpm_partition_idx[ ][ ] is "bypass".

When merge_gpm_partition_idx[x0][y0] is not present, it is inferred to be equal to 0.

Step 2: Based on the value of the indicator and a predefined lookup table to obtain a value of a first parameter and a value of a second parameter.

(Parameter1,parameter2)=lookupTable (indicator)

In an embodiment, the partition angle variable angleIdx (parameter 1) and the distance variable distanceIdx (parameter 2) of the geometric partitioning mode are set according to the value of merge_gpm_partition_idx[xCb][yCb] (indicator) as specified in the following table. It could be understood that, in the implementation, this relationship can be implemented according to table 1 or according to a function.

TABLE 1

Specification of angleIdx and distanceIdx based on merge_gpm_partition_idx.

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| merge_gpm_partition_idx | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |
| merge_gpm_partition_idx | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

Step 3: For a sample in the current decoding block, a sample distance (sample_dist) is calculated according to the value of the first parameter and the value of the second parameter. In an embodiment, step 3 comprises:

Step 3.1: obtain an index value of an angle parameter (alphaN or angleIdx) for the current block, a value of width of the current block (W), a value of height of the current block (H). The W and H are width and height of the current block in number of samples. For example, a coding block with width and height both equal to 8 is a square block that comprises 64 samples. In another example, the W and H are a width and a height of the current block, in number of luma samples. The index value of the angle parameter may be obtained according to the above description refer to table 1.

Step 3.2: obtain a value of a ratio whRatio according to the value of W and the value of H, the value of whRatio represent a ratio between the width and height of the current coding block.

In an example, whRatio=H/W; or whRatio=W/H.

In another example, two variables nCbW and nCbH specify the width and the height of the current coding block, a variable cIdx specify colour component index.

variables nW, nH and whRatio are derived as follows:

```
nW = ( cIdx  = =  0 ) ? nCbW : nCbW * SubWidthC
nH = ( cIdx  = =  0 ) ? nCbH : nCbH * SubHeightC
whRatio = nH / nW.
```

In an example, the variables SubWidthC and SubHeightC are specified in table 2, depending on the chroma format sampling structure, which is specified through chroma_format_idc(chroma_format_idc specifies the chroma sampling relative to the luma sampling) and separate_colour_plane_flag (separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value). Other values of chroma_format_idc, SubWidthC and SubHeightC may be specified in the future by ITU-T| ISO/IEC.

TABLE 2

SubWidthC and SubHeightC values derived from chroma_format_idc and separate_colour_plane_flag

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In monochrome sampling there is only one sample array, which is nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling, depending on the value of separate_colour_plane_flag, the following applies:

If separate_colour_plane_flag is equal to 0, each of the two chroma arrays has the same height and width as the luma array.

Otherwise (separate_colour_plane_flag is equal to 1), the three colour planes are separately processed as monochrome sampled pictures.

Step 3.3: Obtain a shiftHor value according to a lookup table, the value of the alpha and the value of the whRatio, in an example, the value of the alpha (alphaN or angleIdx) and the value of the whRatio are used as index values of the lookup table. It could be understand that, the shiftHor value also could be obtained according to a function, wherein the value of the alpha (alphaN or angleIdx) and the value of the whRatio are the input to the function and the shiftHor value is the output of the function. In an example, the result of the function is similar or same as the lookup table. In an example, the shiftHor value represents a quantization step size for the sample distance calculation process.

In another example, the function may be represented by shiftHor = ( angleIdx % 16 == 8 || ( angleIdx % 16 != 0 && whRatio > 0) ) ? 0 : 1.

Step 3.4: a value of the sample_dist is calculated according to the shiftHor value.

In an example, for calculating sample distance (sample_dist), first, variables offsetX and offsetY are derived as follows:

If shiftHor is equal to 0, the following applies:

```
offestX = ( -nW ) >> 1,
offsetY = ( ( -nH ) >> 1 ) +
( angleIdx < 16 ? ( distanceIdx * nH ) >> 3 : -( ( distanceIdx *
nH ) >> 3 ) );
```

Otherwise (shiftHor is equal to 1), the following applies:

```
offestX = ( ( -nW ) >> 1 ) +
( angleIdx < 16 ? ( distanceIdx * nW ) >> 3 : -( ( distanceIdx *
nW ) >> 3 ) );
offsetY = ( - nH ) >> 1;
```

The variables xL and yL are derived as follows:

```
xL = ( cIdx  = =  0 ) ? x : x * SubWidthC
yL = ( cIdx  = =  0 ) ? y : y * SubHeightC
sample_dist = ( ( ( xL + offsetX ) << 1 ) + 1 ) * disLut[
    displacementX ] + ( ( ( yL + offsetY ) << 1 ) + 1 ) ) *
    disLut[ displacementY ].
```

The variables displacementX and displacementY are derived as follows:

```
hwRatio = cbHeight / cbWidth;
displacementX = angleIdx;
displacementY = ( angleIdx + 8 ) % 32.
```

The array disLut specified in table 3 as follows:

TABLE 3

Specification of the geometric partitioning distance array disLut.

| | idx | | | | | | | | | | | |
|---|---|---|---|---|---|---|---|---|---|---|---|---|
| | 0 | 2 | 3 | 4 | 5 | 6 | 8 | 10 | 11 | 12 | 13 | 14 |
| disLut[idx] | 8 | 8 | 8 | 4 | 4 | 2 | 0 | -2 | -4 | -4 | -8 | -8 |
| | idx | | | | | | | | | | | |
| | 16 | 18 | 19 | 20 | 21 | 22 | 24 | 26 | 27 | 28 | 29 | 30 |
| disLut[idx] | -8 | -8 | -8 | -4 | -4 | -2 | 0 | 2 | 4 | 4 | 8 | 8 |

In another embodiment, in an example, the Step 3 in the above embodiments may comprise the following steps:

Step 3.1: obtain a value of an angle parameter (alphaN or angleIdx) for the current block, a value of a distance index (distanceIdx), a value of width of the current block (W), a value of height of the current block (H). The W and H are width and height of the current block in number of samples. For example, a coding block with width and height both equal to 8 is a square block that comprises 64 samples. In another example, the W and H are width and height of the current block, in number of luma samples. The index value of the angle parameter may be obtained according to the above description refer to table 1.

Step 3.2: obtain a value of a ratio whRatio according to the value of W and the value of H, the value of whRtaio represent a ratio between the width and height of the current coding block.

In an example, whRatio = H / W; or whRatio= W/H.

In another example, two variables nCbW and nCbH specify the width and the height of the current coding block, a variable cIdx specify colour component index.

variables nW, nH and whRatio are derived as follows:

```
nW = ( cIdx  = =  0 ) ? nCbW : nCbW * SubWidthC;
nH = ( cIdx  = =  0 ) ? nCbH : nCbH * SubHeightC;
whRatio = nH / nW.
```

Step 3.3: Obtain a shiftHor value according to a lookup table, the value of the alpha and the value of the whRatio, in an example, the value of the alphaN and the value of the whRatio are used as index values of the lookup table. In an example, the shiftHor value represents a quantization step size for the sample distance calculation process. The shiftHor value can also be obtained according to a function, wherein the value of the alpha (alphaN or angleIdx) and the value of the whRatio are the input to the function and the shiftHor value is the output of the function. In an example, the result of the function is similar or same as the lookup table. In an example, the shiftHor value represents a quantization step size for the sample distance calculation process.

In another example, the function may be represented by shiftHor = ( angleIdx % 16
== 8 | | ( angleIdx % 16 != 0 && whRatio >0) ) ? 0 : 1.

Step 3.4: a value of the sample_dist is calculated according to the shiftHor value, the value of distanceIdx, the value of the angle (alphaN or angleIdx), the value of W and the value of H.

In an example, for calculating sample distance (sample_dist), first, variables offsetX and offsetY are derived as follows:

If shiftHor is equal to 0, the following applies:

```
offestX = ( -nW ) >> 1,
offsetY = ( ( -nH ) >> 1 ) +
  ( angleIdx < 16 ? ( distanceIdx * nH ) >> 3 : -( ( distanceIdx *
  nH ) >> 3 ) );
```

Otherwise (shiftHor is equal to 1), the following applies:

```
offsetX = ( ( -nW ) >> 1 ) +
  ( angleIdx < 16 ? ( distanceIdx * nW ) >> 3 : -( ( distanceIdx *
  nW ) >> 3 ) );
offsetY = ( - nH ) >> 1;
```

The variables xL and yL are derived as follows:

```
xL = ( cIdx  = =  0 ) ? x : x * SubWidthC
yL = ( cIdx  = =  0 ) ? y : y * SubHeightC
sample_dist = ( ( ( xL + offsetX ) << 1 ) + 1 ) * disLut[
  displacementX ] + ( ( ( yL + offsetY ) << 1 ) + 1 ) ) *
  disLut[ displacementY ].
```

The variables displacementX and displacementY are derived as follows:

```
hwRatio = cbHeight / cbWidth;
displacementX = angleIdx;
displacementY = ( angleIdx + 8 ) % 32.
```

The array disLut is specified in the above table 3.

Step 4: The calculated sample_dist is used to calculate weighting factors, the weighting factors are used for the combination of a first prediction value and a second prediction value corresponding to the said sample. In an example, the weighting factors are denoted as sampleWeight1 and sampleWeight2, referring to the weight corresponding to the first prediction value and the weight corresponding to the second prediction value.

In one example, weighting factors are calculated according to the following functions,

```
weightIdxL = partFlip ? 32 + sample_dist : 32 - sample_dist;
wValue = Clip3( 0, 8, ( weightIdxL + 4 ) >> 3 ).
```

In this example, wValue is sampleWeight1, and 8-wValue is sampleWeight2. The variable partFlip is determined according to a value of angleIdx. In an example, partFlip= (angleIdx>=13 && angleIdx<=27)?0:1, or partFlip=(angleIdx>=13 && angleIdx<=27)?1:0.

Step 5: The combined value of the prediction sample at the sample coordinate (x,y) is calculated according to, the first prediction value at coordinate (x,y), the second prediction value at coordinate (x,y), sampleWeight1 and sampleWeight2.

In an example, the prediction sample value is derived as follows:

```
pbSample[ x ][ y ] = Clip3( 0, ( 1 << BitDepth ) − 1,
( predSamplesLA[ x ][ y ] * wValue +
    predSamplesLB[ x ][ y ] * ( 8 − wValue ) + offset1 ) >> shift1 ).
```

Wherein bitDepth represents sample bit depth, variable shift1 is obtained according to the bitDepth, in an example, shift1=Max(5, 17−BitDepth); Varable offset1 is obtained according to the shift1, in an example, offset1=1<<(shift1−1), predSamplesLA and predSamplesLB are two (nCbW)×(nCbH) arrays.

Embodiment 2 (Encoder Perspective)

In this embodiment, the following steps are applied.

Step 0: Select a value of a first parameter and a value of a second parameter, in an example, the value of the first parameter and the value of the second parameter are obtained according to a rate-distortion metric.

Step 1: Obtain an index value according to the value of the first parameter, the value of the second parameter and according to a lookup table such that:

(Parameter1,parameter2)=lookupTable(index)

Step 2: Encode the index value into a bitstream.

Optionally, the following steps are used in this embodiment,

Step 3: For a sample in a coding block, a sample distance (sample_dist) is calculated according to the value of the first parameter and the value of the second parameter.

Step 4: The calculated sample_dist is used to calculate weighting factors for the combination of a first prediction value and a second prediction value corresponding to the said sample. The weighting factors are denoted as sampleWeight1 and sampleWeight2, referring to a weight value corresponding to a first prediction value and a weight value corresponding to the second prediction value.

Step 5: The combined prediction value for the sample at coordinate (x,y) is calculated according to the first prediction value at coordinate (x,y), the second prediction value at coordinate (x,y), sampleWeight1 and sampleWeight2.

The details for each step at the encoder side correspond to the above examples describing the decoder side.

According to an example, the lookup table in the embodiment 1 is same as the lookup table in the embodiment 2, so that the encoder and the decoder can obtain the same result.

In some examples, the sample distance may represents the horizontal distance or the vertical distance, or a combination of vertical and horizontal distance, of the said sample to a separation line (the separation line is used to divides a coding block into two subblocks). The said sample is represented by a coordinates (x,y) with respect to the top-left sample of the coding block. The sample coordinate and the sample_dist are exemplified in FIG. 11 and FIG. 12.

In an example, the first parameter represents a quantized angle value (angleIdx) and the second parameter represents a quantized distance value (distanceIdx). The two parameters describe a line equation. In an example, the distance 1230 can be obtained according to distanceIdx (second parameter), and angle alpha (1210) can be obtained according to angleIdx (first parameter). The distance 1230 can be a distance to the center of a coding block, and the angle can be an angle between the separation line and the horizontal (or equivalently the vertical) line passing through the center point of the coding block.

In one example the lookup table is predefined.

In an example there can be more than one predefined lookup table. In an example, one lookup table for a coding block is used if the aspect ratio (aspect ratio=W>H?W/H:H/W) of a block is equal to 1. In another example, one or more lookup tables (that are not identical to the said one lookup table) are used if the aspect ratio is not equal to 1, where W and H are width and height of a coding block.

In another example, there can be more than one predefined lookup table, one lookup table for the coding blocks, the W*H of the block is greater than a threshold; and one or more lookup tables (that are not identical to the said one lookup table) are used for the block if the W*H of the block is smaller than or equal to a threshold. For example, if the size of the current block to be predicted is smaller than or equal to 32×32 luminance samples, a first look-up table is used. Otherwise, if the size of the current coding block is larger than 32×32 luminance samples, a second look-up table is used. The two look-up tables may contain different sets of parameters in regard to the diverse properties of different block-sizes. For example, the second look-up table may contain more parameters than the first look-up table to provide more partitioning flexibility for larger blocks.

In some examples, if there are more than 1 predefined lookup table are used for a block, a function f(W,H) may be used to determine one lookup table for the block, where W and H are width and height of the coding block.

In another example, a sample distance sample_dist is calculated according to the formula:

sample_dist = ((x<<1)*Dis[angleIdx1] + ((y<<1) + 1))*Dis[angleIdx2] − offset(distanceIdx).

Value of angleIdx1 and value of angleIdx2 are from the bitstream or derived/calculated based on other information obtained from the bistream, angleIdx1 and angleIdx2 represent quantized trigonometric parameters of a separation line, the first one of type cosine and the second one of type sine. In an example, x and y are the −x and −y coordinates of a sample with respect to top-left sample of a coding block.

Dis[ ] is a lookup table. Dis[angleIdx1] describes the change in the sample distance (sample_dist) with respect to a unit increase (an increase of value 1) in the −x coordinate of the said sample. The Dis[angleIdx2] describes the change in the sample distance (sample_dist) with respect to a unit increase (an increase of value 1) in the −y coordinate of the said sample. In one example, angleIdx1 is equal to angleIdx and angleIdx2 is equal to (displacementX+8)%32.

offset(distanceIdx) is an offset value which is a function of an index value (distanceIdx), the index value is obtained from the bistream or derived/calculated based on other information obtained from the bistream.

Construction of the Lookup Table:

According to one example, a value range for the first parameter may between 0 and 4K−1, where K is an integer that is greater than 0; a value range for the second parameter may between 0 to N. In this case, the rows of the said lookup table may includes all combinations of the first parameter and the second parameter except for the combinations:

First set of pairs: a value of second parameter is equal to 0 and a value of first parameter is equal to one of {0, K, 2K, 3K}.

Second set of pairs: a value of second parameter=0, a value of first parameter equal to one of {K/2, 3K/2, 5K/2, 7K/2}.

Third set of parameters: a value of second parameter=0, a value of first parameter greater than or equal to 2K.

In an example, a value of K is 8 or 4. The number K describes how many discrete angle values are used to partition 90 degrees of angle. In an example, if the number K is 8, the line of separation might have the following angle values: 0, 11.25, 22.5, 33.75, 45, . . . degrees. In another example, if the value of K is 4, then the angle values are: 0, 22.5, 45, 67.5, . . . degrees.

In an example, a value of N is 4. In general N can be an integer number greater than 0.

In some embodiments, the second parameter describes a distance of the separation line to the center of a coding block. If a value of the second parameter is zero, this means that the separation line passes through the center of the coding block. If a value of the first parameter is equal to K, this means that the separation line is either horizontally or vertically oriented (angle value is equal to 0, 90, 270 or 360 degrees). The first set of pairs are excluded from the lookup table as this would create a redundant partition, that can also be achieved by binary (meaning into two) partitioning of a coding block with binary tree. The binary splitting is a mechanism in that partitions a coding block into equal sized 2 coding blocks along the vertical or horizontal axis (and not into subblocks). Therefore according to embodiments of the present invention, the First set of pairs are excluded from the lookup table.

Second set of pairs are excluded from the lookup table, as the second set of pairs would create divisions that can be achieved by triangular prediction mode. Therefore excluding the second set of pairs would prevent redundant subblock partitions.

The third set of pairs are excluded from the table as when the angle is equal to X or X+180, identical partitions would be created if the second parameter is equal to zero.

According to another example, the following pairs can be excluded from the lookup table:
- A value of Second parameter equal N and a value of First parameter equal to one of {K/2, 3K/2, 5K/2, 7K/2}.
- A value of Second parameter equal N and a value of First parameter equal to one of {K/2−1, 3K/2−1, 5K/2−1, 7K/2−1, K/2+1, 3K/2+1, 5K/2+1, 7K/2+1}.

In some embodiments, the above pairs might be excluded from the lookup table since they create 2 subblocks, one of which might be too small. If a value of the first parameter is equal to K/2, 3k/2, . . . , this means that the angle of the separation line is 45 degrees, 135 degrees, 225 degrees or 315 degrees. If a value of the second parameter is equal to N (which is the highest value), then one of the subblocks would comprise a small part of one corner of the coding block, which would be too small for the division operation.

Ordering of Pairs in the Lookup Table:

According to one example, the pairs (first parameter, second parameter) can be added at the end of the lookup table, if the second parameter is equal to N (where N is the highest possible value of the second parameter). In other words, if there are P pairs where the value of the second parameter is equal to N, then the last P entries of the lookup table can comprise the said P pair. For example, if N is equal to 4 and K is equal to 8, then there are P=4K*1=32 pairs of parameters for which the second parameter is equal to 4.

According to another example, the pairs of parameters are ordered according to a heuristic process. This heuristic process may be determined from training data which, for example, reflects the occurrence or usage of parameter pairs in the training data set. Thereby, more frequently occurring parameter pairs are placed at the beginning of the list, while less frequently occurring parameter pairs are placed at the end of the list.

When the second parameter is equal to N, one subblock is smaller than the other subblock. It is less likely to select such a partition (compared to cases where the number of samples in each subblock is more similar). Moreover, an index value (of the lookup table) that has a higher value usually requires higher number of bits in order to be encoded into a bitstream. Therefore it increases the compression efficiency to include less likely pairs at the end of the table, hence beginning of the table can be allocated to more likely pairs (e.g. pairs that result in more favorable subblock partitions).

One example of the indicator (geo_partition_idx) and the lookup table are given below. The indicator has a value between 0 and 139, which is used to select first parameter and the second parameter using a lookup table. An example of the lookup table is Table 4.

TABLE 4 lookup table where geo_partition_idx is the index to of the table and angleIdx is first parameter and distanceIdx is second parameter.

| geo_partition_idx | angleIdx | distanceIdx |
| --- | --- | --- |
| 0 | 0 | 1 |
| 1 | 0 | 2 |
| 2 | 0 | 3 |
| 3 | 0 | 4 |
| 4 | 1 | 0 |
| 5 | 1 | 1 |
| 6 | 1 | 2 |
| 7 | 1 | 3 |
| 8 | 1 | 4 |
| 9 | 2 | 0 |
| 10 | 2 | 1 |
| 11 | 2 | 2 |
| 12 | 2 | 3 |
| 13 | 2 | 4 |
| 14 | 3 | 0 |
| 15 | 3 | 1 |
| 16 | 3 | 2 |
| 17 | 3 | 3 |
| 18 | 3 | 4 |
| 19 | 4 | 1 |
| 20 | 4 | 2 |
| 21 | 4 | 3 |
| 22 | 4 | 4 |
| 23 | 5 | 0 |
| 24 | 5 | 1 |
| 25 | 5 | 2 |
| 26 | 5 | 3 |
| 27 | 5 | 4 |
| 28 | 6 | 0 |
| 29 | 6 | 1 |
| 30 | 6 | 2 |
| 31 | 6 | 3 |
| 32 | 6 | 4 |
| 33 | 7 | 0 |
| 34 | 7 | 1 |
| 35 | 7 | 2 |
| 36 | 7 | 3 |
| 37 | 7 | 4 |
| 38 | 8 | 1 |
| 39 | 8 | 2 |
| 40 | 8 | 3 |
| 41 | 8 | 4 |
| 42 | 9 | 0 |
| 43 | 9 | 1 |
| 44 | 9 | 2 |
| 45 | 9 | 3 |
| 46 | 9 | 4 |
| 47 | 10 | 0 |
| 48 | 10 | 1 |
| 49 | 10 | 2 |

TABLE 4-continued lookup table where geo_partition_idx is the index to of the table and angleIdx is first parameter and distanceIdx is second parameter.

| geo_partition_idx | angleIdx | distanceIdx |
|---|---|---|
| 50 | 10 | 3 |
| 51 | 10 | 4 |
| 52 | 11 | 0 |
| 53 | 11 | 1 |
| 54 | 11 | 2 |
| 55 | 11 | 3 |
| 56 | 11 | 4 |
| 57 | 12 | 1 |
| 58 | 12 | 2 |
| 59 | 12 | 3 |
| 60 | 12 | 4 |
| 61 | 13 | 0 |
| 62 | 13 | 1 |
| 63 | 13 | 2 |
| 64 | 13 | 3 |
| 65 | 13 | 4 |
| 66 | 14 | 0 |
| 67 | 14 | 1 |
| 68 | 14 | 2 |
| 69 | 14 | 3 |
| 70 | 14 | 4 |
| 71 | 15 | 0 |
| 72 | 15 | 1 |
| 73 | 15 | 2 |
| 74 | 15 | 3 |
| 75 | 15 | 4 |
| 76 | 16 | 1 |
| 77 | 16 | 2 |
| 78 | 16 | 3 |
| 79 | 16 | 4 |
| 80 | 17 | 1 |
| 81 | 17 | 2 |
| 82 | 17 | 3 |
| 83 | 17 | 4 |
| 84 | 18 | 1 |
| 85 | 18 | 2 |
| 86 | 18 | 3 |
| 87 | 18 | 4 |
| 88 | 19 | 1 |
| 89 | 19 | 2 |
| 90 | 19 | 3 |
| 91 | 19 | 4 |
| 92 | 20 | 1 |
| 93 | 20 | 2 |
| 94 | 20 | 3 |
| 95 | 20 | 4 |
| 96 | 21 | 1 |
| 97 | 21 | 2 |
| 98 | 21 | 3 |
| 99 | 21 | 4 |
| 100 | 22 | 1 |
| 101 | 22 | 2 |
| 102 | 22 | 3 |
| 103 | 22 | 4 |
| 104 | 23 | 1 |
| 105 | 23 | 2 |
| 106 | 23 | 3 |
| 107 | 23 | 4 |
| 108 | 24 | 1 |
| 109 | 24 | 2 |
| 110 | 24 | 3 |
| 111 | 24 | 4 |
| 112 | 25 | 1 |
| 113 | 25 | 2 |
| 114 | 25 | 3 |
| 115 | 25 | 4 |
| 116 | 26 | 1 |
| 117 | 26 | 2 |
| 118 | 26 | 3 |
| 119 | 26 | 4 |
| 120 | 27 | 1 |
| 121 | 27 | 2 |
| 122 | 27 | 3 |
| 123 | 27 | 4 |
| 124 | 28 | 1 |
| 125 | 28 | 2 |
| 126 | 28 | 3 |
| 127 | 28 | 4 |
| 128 | 29 | 1 |
| 129 | 29 | 2 |
| 130 | 29 | 3 |
| 131 | 29 | 4 |
| 132 | 30 | 1 |
| 133 | 30 | 2 |
| 134 | 30 | 3 |
| 135 | 30 | 4 |
| 136 | 31 | 1 |
| 137 | 31 | 2 |
| 138 | 31 | 3 |
| 139 | 31 | 4 |

It could understand that, table 4 is just an example to show possible combination values for first parameter and second parameter, in other implementations, part of table 4 may be used as the lookup table to obtain the first parameter and the second parameter.

Example 1. A method of coding implemented by a decoding device, comprising:
  obtaining a bitstream;
  obtaining a value of an indicator for a current block according to the bitstream;
  obtaining a value of a first parameter for the current block and a value of a second parameter for the current block, according to the value of the indicator and a predefined lookup table;
  obtaining a value of a sample distance for a sample which is located in the current block, according to the value of the first parameter and the value of the second parameter;
  obtaining a prediction value for the sample, according to the value of the sample distance for the sample.

Example 2. The method of example 1, wherein the first parameter represents an angular for partitioning of the current block.

Example 3. The method of example 1 or 2, wherein the second parameter represents a distance for partitioning of the current block.

Example 4. The method of any one of examples 1 to 3, wherein the predefined lookup table is comprised of first and second parameter pairs (in an example, each entry in the table is a unique pair of first parameter and second parameter),
  the following pair is in the predefined lookup table:
  first parameter represents an angular corresponding to one of the angles of 0, 45, 90, 135, 180, 225, 270 or 315 degrees, and the corresponding the second parameter of the pair does not represent a distance of zero samples from the center of the current block.

Example 5. The method of any one of examples 1 to 4, wherein the predefined lookup table is comprised of first and second parameter pairs (in an example, each entry in the table is a unique pair of first parameter and second parameter), the following pair is in the predefined lookup table;
  first parameter represents an angular not corresponding to one of the angles of 0, 45, 90, 135, 180, 225, 270 or 315 degrees, and the corresponding the second parameter of the pair represents a distance of zero samples from the center of the current block.

Example 6. The method of any one of examples 1 to 5, wherein the predefined lookup table is comprised of first and second parameter pairs (in an example, each entry in the table is a unique pair of first parameter and second parameter), the following pair is not comprised in the predefined lookup table;

first parameter represents an angular corresponding to one of the angles of 0, 45, 90, 135, 180, 225, 270 or 315 degrees, and the corresponding the second parameter of the pair represents a distance of zero samples from the center of the current block.

Example 7. A decoder (30) comprising processing circuitry for carrying out the method according to any one of examples 1 to 6.

Example 8. A computer program product comprising a program code for performing the method according to any one of examples 1 to 6.

Example 9. A decoder, comprising:
one or more processors; and
a non-transitory computer-readable storage medium coupled to the processors and storing programming for execution by the processors, wherein the programming, when executed by the processors, configures the decoder to carry out the method according to any one of examples 1 to 6.

Following is an explanation of the applications of the encoding method as well as the decoding method as shown in the above-mentioned embodiments, and a system using them.

Figure 13:
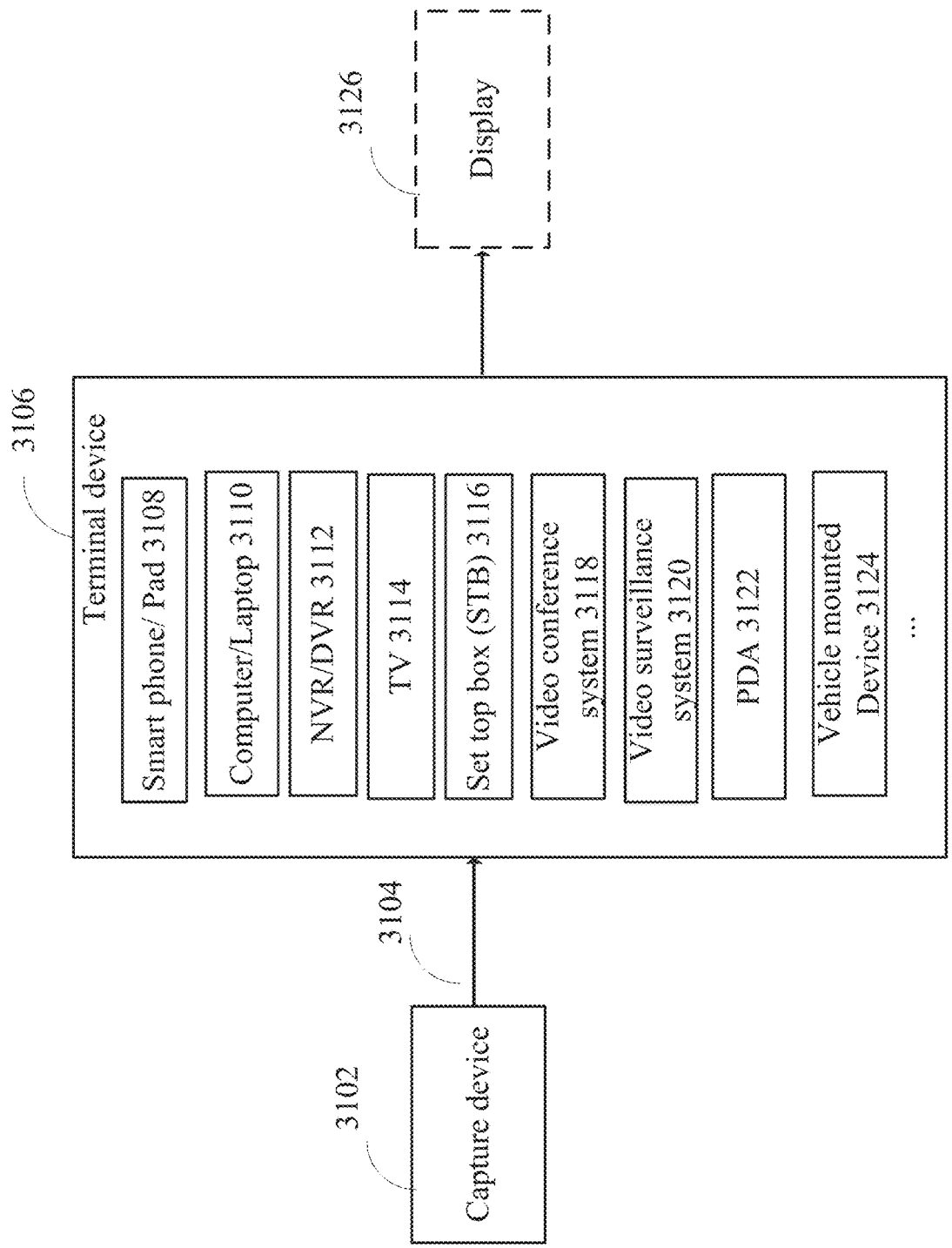
FIG. 13 is a block diagram showing an example structure of a content supply system 3100 which realizes a content delivery service.

FIG. 13 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 14:
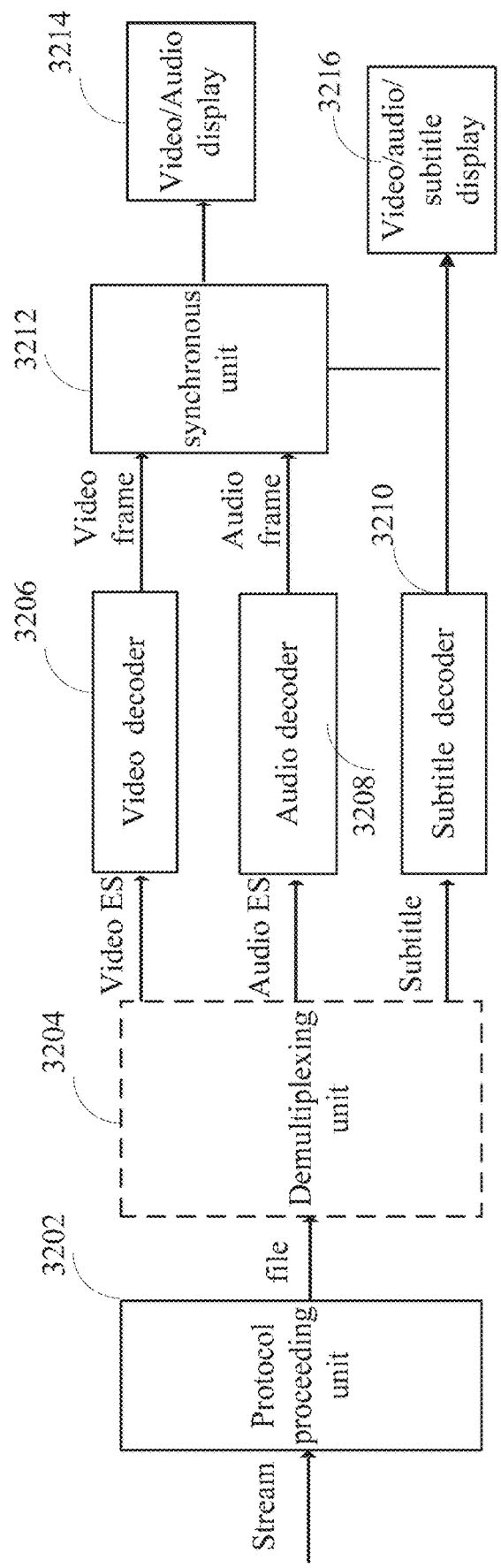
FIG. 14 is a block diagram showing a structure of an example of a terminal device.
Figure 15:
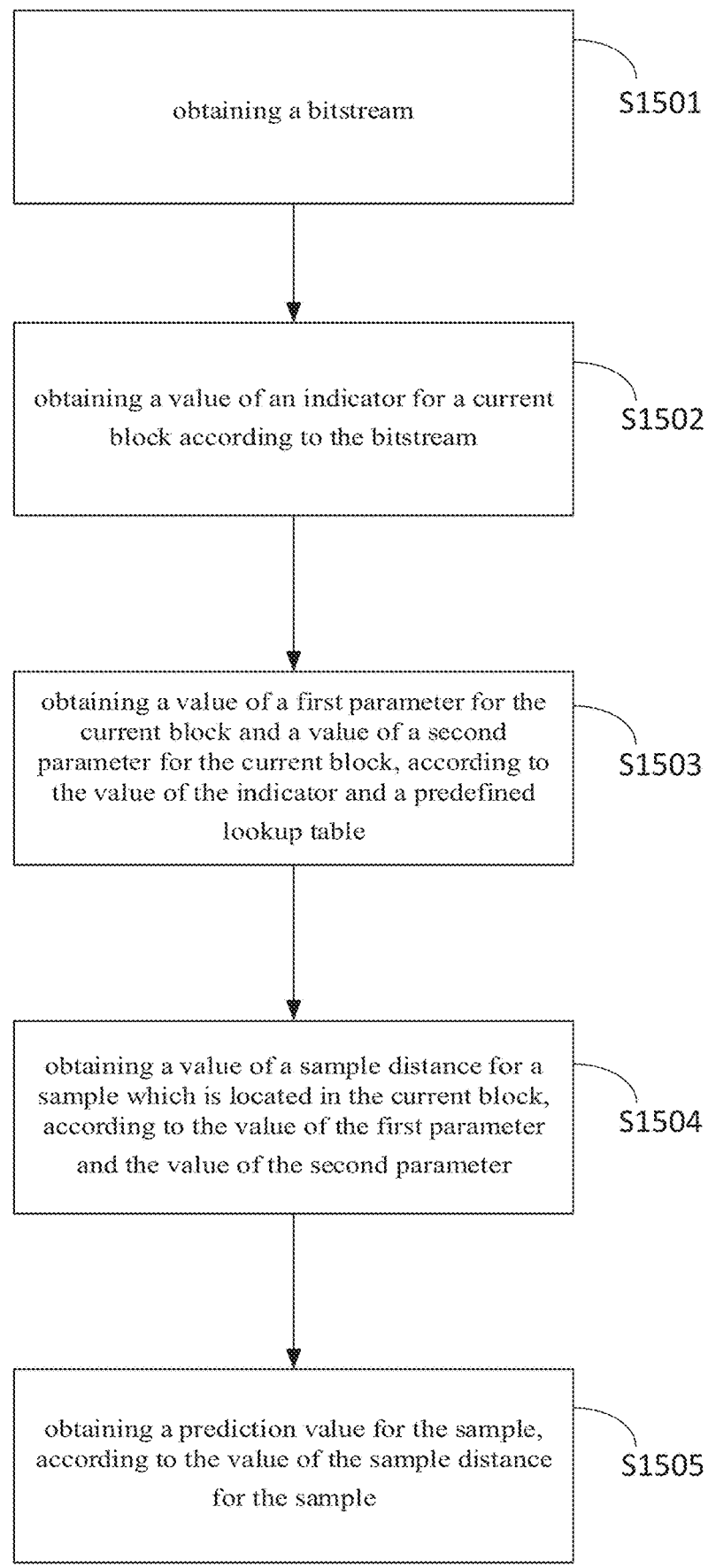
FIG. 15 is a flowchart showing a method embodiment refer to the present invention.
Figure 16:
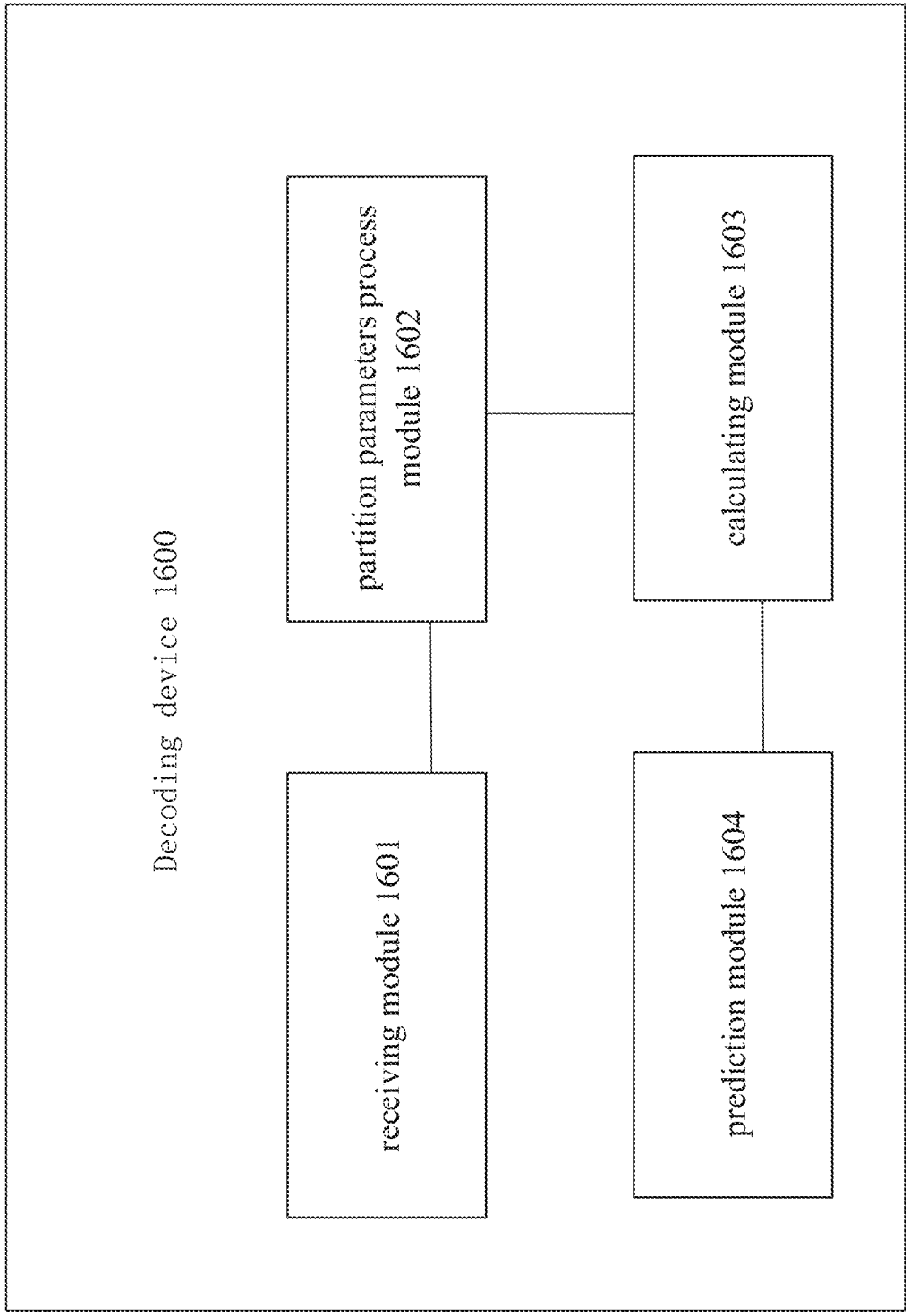
FIG. 16 is a block diagram showing an apparatus embodiment refer to the present invention.

FIG. 14 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 14) before feeding it to the synchronous unit 3212. Similarly, the audio frame may store in a buffer (not shown in FIG. 14) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present invention is not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
\* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.

Modulus. Remainder of x divided by y, defined only for integers x and y with x>=x % y 0 and y>0.

Logical Operators

The following logical operators are defined as follows:
x && y Boolean logical "and" of x and y
x||y Boolean logical "or" of x and y
! Boolean logical "not"
x?y: z If x is TRUE or not equal to 0, evaluates to the value of y; otherwise, evaluates to the value of z.

Relational Operators

The following relational operators are defined as follows:
\> Greater than
\>= Greater than or equal to
< Less than
<= Less than or equal to
== Equal to
!=Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:
= Assignment operator
++ Increment, i.e., x++ is equivalent to x=x+1; when used in an array index, evaluates to the value of the variable prior to the increment operation.
−− Decrement, i.e., x−− is equivalent to x=x−1; when used in an array index, evaluates to the value of the variable prior to the decrement operation.
+= Increment by amount specified, i.e., x+=3 is equivalent to x=x+3, and
x+=(−3) is equivalent to x=x+(−3).
−=Decrement by amount specified, i.e., x=3 is equivalent to x=x−3, and
x−=(−3) is equivalent to x=x−(−3).

Range Notation

The following notation is used to specify a range of values:
x=y . . . z x takes on integer values starting from y to z, inclusive, with x, y, and z being integer numbers and z being greater than y.

Mathematical Functions

The following mathematical functions are defined:

$$\text{Abs}(x) = \begin{cases} x; & x >= 0 \\ -x; & x < 0 \end{cases}$$

Asin(x) the trigonometric inverse sine function, operating on an argument x that is in the range of −1.0 to 1.0, inclusive, with an output value in the range of −π ÷ 2 to π ÷ 2, inclusive, in units of radians -continued Atan(x) the trigonometric inverse tangent function, operating on an argument x, with an output value in the range of $-\pi \div 2$ to $\pi \div 2$, inclusive, in units of radians $$\text{Atan2}(y, x) = \begin{cases} \text{Atan}\left(\frac{y}{x}\right); & x > 0 \\ \text{Atan}\left(\frac{y}{x}\right) + \pi; & x < 0 \,\&\&\, y >= 0 \\ \text{Atan}\left(\frac{y}{x}\right) - \pi; & x < 0 \,\&\&\, y < 0 \\ +\frac{\pi}{2}; & x == 0 \,\&\&\, y >= 0 \\ -\frac{\pi}{2}; & \text{otherwise} \end{cases}$$

Ceil(x) the smallest integer greater than or equal to x.
$\text{Clip1}_Y(x) = \text{Clip3}(0, (1 << \text{BitDepth}_Y) - 1, x)$
$\text{Clip1}_C(x) = \text{Clip3}(0, (1 << \text{BitDepth}_C) - 1, x)$ $$\text{Clip3}(x, y, z) = \begin{cases} x; & z < x \\ y; & z > y \\ z; & \text{otherwise} \end{cases}$$

Cos(x) the trigonometric cosine function operating on an argument x in units of radians.
Floor(x) the largest integer less than or equal to x.

$$\text{GetCurrMsb}(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718 281 828 . . .).
Log2(x) the base-2 logarithm of x.
Log10(x) the base-10 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

Round(x) = Sign(x) * Floor(Abs(x) + 0.5)

$$\text{Sign}(x) = \begin{cases} 1; & x > 0 \\ 0; & x == 0 \\ -1; & x < 0 \end{cases}$$

Sin(x) the trigonometric sine function operating on an argument x in units of radians
Sqrt(x) = $\sqrt{x}$
Swap(x, y) = (y, x)
Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table)

operations (with operands x, y, and z)

"x++", "x− −"
"!x", "−x" (as a unary prefix operator)
$x^y$

"x * y", "x/y", "x ÷ y", "$\frac{x}{y}$", "x % y"

"x + y", "x − y" (as a two-argument operator), "$\sum_{i=x}^{y} f(i)$"

"x << y", "x >> y"
"x < y", "x <= y", "x > y", "x >= y"
"x == y", "x != y"
"x & y"
"x | y"
"x && y"
"x | | y"
"x ? y : z"
"x .. y"
"x = y", "x += y", "x −= y"

Text Description of Logical Operations

In the text, a statement of logical operations as would be described mathematically in the following form:

```
if( condition 0 )
    statement 0
else if( condition 1 )
    statement 1
...
else /* informative remark on remaining condition */
    statement n
may be described in the following manner:
    . . . as follows / . . . the following applies:
        — If condition 0, statement 0
        — Otherwise, if condition 1, statement 1
        — . . .
        — Otherwise (informative remark on remaining
          condition), statement n.
```

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . ". the following applies" with the ending "Otherwise, . . . ".

In the text, a statement of logical operations as would be described mathematically in the following form:

```
if( condition 0a && condition 0b )
    statement 0
else if( condition 1a || condition 1b )
    statement 1
...
else
    statement n
may be described in the following manner:
    . . . as follows / . . . the following applies:
        — If all of the following conditions are true, statement 0:
            — condition 0a
            — condition 0b
        — Otherwise, if one or more of the following
          conditions are true, statement 1:
            — condition 1a
```

```
— condition 1b
— ...
— Otherwise, statement n
```

In the text, a statement of logical operations as would be described mathematically in the following form:

```
if( condition 0 )
    statement 0
if( condition 1 )
    statement 1
may be described in the following manner:
    When condition 0, statement 0
    When condition 1, statement 1.
```

Although embodiments of the invention have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter operative hardware units, including one or more processors as described above, in conjunction with suitable software and/or firmware.

What is claimed is:
1. A method of coding implemented by a decoding device, the method comprising:
    obtaining a value of an indicator for a current block according to a bitstream;
    obtaining a value of a first parameter for the current block and a value of a second parameter for the current block according to the value of the indicator and a predefined lookup table;
    obtaining a value of a sample distance for a sample which is located in the current block according to the value of the first parameter and the value of the second parameter; and
    obtaining a prediction value for the sample according to the value of the sample distance for the sample, including:
    determining two weighting factors corresponding to the two sub-blocks according to the sample distance value; and
    obtaining the prediction value for the sample according to a first prediction value for a first sub-block of the two sub-blocks based on a first prediction mode, a second prediction value for a second sub-block of the two sub-blocks based on a second prediction mode and the two weighting factors;

wherein the predefined lookup table is:

| merge_gpm_partition_idx | 0 | 1 | 2 | 3 | 4 | 5 | 6 | 7 |
|---|---|---|---|---|---|---|---|---|
| angleIdx | 0 | 0 | 2 | 2 | 2 | 2 | 3 | 3 |
| distanceIdx | 1 | 3 | 0 | 1 | 2 | 3 | 0 | 1 |
| merge_gpm_partition_idx | 16 | 17 | 18 | 19 | 20 | 21 | 22 | 23 |
| angleIdx | 5 | 5 | 8 | 8 | 11 | 11 | 11 | 11 |
| distanceIdx | 2 | 3 | 1 | 3 | 0 | 1 | 2 | 3 |
| merge_gpm_partition_idx | 32 | 33 | 34 | 35 | 36 | 37 | 38 | 39 |
| angleIdx | 14 | 14 | 14 | 14 | 16 | 16 | 18 | 18 |
| distanceIdx | 0 | 1 | 2 | 3 | 1 | 3 | 1 | 2 |
| merge_gpm_partition_idx | 48 | 49 | 50 | 51 | 52 | 53 | 54 | 55 |
| angleIdx | 21 | 21 | 24 | 24 | 27 | 27 | 27 | 28 |
| distanceIdx | 2 | 3 | 1 | 3 | 1 | 2 | 3 | 1 |
| merge_gpm_partition_idx | 8 | 9 | 10 | 11 | 12 | 13 | 14 | 15 |
| angleIdx | 3 | 3 | 4 | 4 | 4 | 4 | 5 | 5 |
| distanceIdx | 2 | 3 | 0 | 1 | 2 | 3 | 0 | 1 |
| merge_gpm_partition_idx | 24 | 25 | 26 | 27 | 28 | 29 | 30 | 31 |
| angleIdx | 12 | 12 | 12 | 12 | 13 | 13 | 13 | 13 |
| distanceIdx | 0 | 1 | 2 | 3 | 0 | 1 | 2 | 3 |
| merge_gpm_partition_idx | 40 | 41 | 42 | 43 | 44 | 45 | 46 | 47 |
| angleIdx | 18 | 19 | 19 | 19 | 20 | 20 | 20 | 21 |
| distanceIdx | 3 | 1 | 2 | 3 | 1 | 2 | 3 | 1 |
| merge_gpm_partition_idx | 56 | 57 | 58 | 59 | 60 | 61 | 62 | 63 |
| angleIdx | 28 | 28 | 29 | 29 | 29 | 30 | 30 | 30 |
| distanceIdx | 2 | 3 | 1 | 2 | 3 | 1 | 2 | 3 | wherein the indicator is merge_gpm_partition_idx, wherein the first parameter is angleIdx, which represents an angle for partitioning of the current block, wherein the second parameter is distanceIdx.

2. The method of claim 1, wherein the second parameter represents a distance for partitioning of the current block.

3. The method of claim 1, wherein the second parameter specifies a distance index of a geometric partition, or the second parameter describes a distance of a separation line to the center of the current block.

4. The method of claim 1, wherein the value of the sample distance represents a horizontal distance or a vertical distance, or a combination of the vertical and horizontal distances, of the sample to a separation line, wherein the separation line is used to divide a coding block into two sub-blocks.

5. The method of claim 1, wherein the predefined lookup table comprises pairs of first and second parameters, wherein based on the first parameter of a pair representing an angle corresponding to one of the angles of 0, 45, 90, 135, 180, 225, 270 or 315 degrees, the corresponding second parameter of the pair does not represent a distance of zero samples from the center of the current block.

6. The method of claim 1, wherein the predefined lookup table comprises pairs of first and second parameters, wherein the first parameter of a pair represents an angle not corresponding to one of the angles of 0, 45, 90, 135, 180, 225, 270 or 315 degrees, and the corresponding second parameter of the pair represents a distance of zero samples from the center of the current block.

7. The method of claim 1, wherein the predefined lookup table comprises pairs of first and second parameters, wherein the first parameter of a pair represents an angle corresponding to one of the angles of 0, 45, 90, 135, 180, 225, 270 or 315 degrees, and the corresponding second parameter of the pair represents a distance of zero samples from the center of the current block.

8. A decoder, comprising:
one or more processors; and
a non-transitory computer-readable storage medium coupled to the one or more processors and storing computer-executable instructions for execution by the one or more processors, wherein the computer-executable instructions, upon being executed by the one or more processors, configure the decoder to carry out the method according to claim 1.

9. A method of coding implemented by an encoding device, the method comprising:
obtaining a value of an indicator for a current block;
obtaining a value of a first parameter for the current block and a value of a second parameter for the current block according to the value of the indicator and a predefined lookup table;
obtaining a value of a sample distance for a sample which is located in the current block according to the value of the first parameter and the value of the second parameter; and
obtaining a prediction value for the sample according to the value of the sample distance for the sample, including:
determining two weighting factors corresponding to the two sub-blocks according to the sample distance value;
obtaining the prediction value for the sample according to a first prediction value for a first sub-block of the two sub-blocks based on a first prediction mode, a second prediction value for a second sub-block of the two sub-blocks based on a second prediction mode and the two weighting factors; and
encoding the indicator into a bitstream;
wherein the predefined lookup table is:

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |

-continued

| merge_gpm_partition_idx | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |

| merge_gpm_partition_idx | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 | wherein the indicator is merge_gpm_partition_idx, wherein the first parameter is angleIdx, which represents an angle for partitioning of the current block, wherein the second parameter is distanceIdx.

10. The method of claim 9, wherein the second parameter represents a distance for partitioning of the current block.

11. The method of claim 9, wherein the second parameter specifies a distance index of a geometric partition, or the second parameter describes a distance of a separation line to the center of the current block.

12. The method of claim 9, wherein the value of the sample distance represents a horizontal distance or a vertical distance, or a combination of the vertical and horizontal distances, of the sample to a separation line, wherein the separation line is used to divide a coding block into two sub-blocks.

13. The method of claim 9, wherein the predefined lookup table comprises pairs of first and second parameters, wherein based on the first parameter of a pair representing an angle corresponding to one of the angles of 0, 45, 90, 135, 180, 225, 270 or 315 degrees, the corresponding second parameter of the pair does not represent a distance of zero samples from the center of the current block.

14. An encoder, comprising:

one or more processors; and a non-transitory computer-readable storage medium coupled to the one or more processors and storing computer-readable instructions for execution by the one or more processors, wherein the computer-readable instructions, upon being executed by the one or more processors, configure the decoder to carry out the method according to claim 9.

* * * * *